US012652478B2

(12) United States Patent
Zhu

(10) Patent No.: US 12,652,478 B2
(45) Date of Patent: *Jun. 9, 2026

(54) SOLID-STATE IMAGE SENSOR, IMAGING DEVICE, AND METHOD OF CONTROLLING SOLID-STATE IMAGE SENSOR

(71) Applicant: SONY SEMICONDUCTOR SOLUTIONS CORPORATION, Kanagawa (JP)

(72) Inventor: Hongbo Zhu, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 266 days.

This patent is subject to a terminal disclaimer.

(21) Appl. No.: 18/488,273

(22) Filed: Oct. 17, 2023

(65) Prior Publication Data

US 2024/0048871 A1    Feb. 8, 2024

Related U.S. Application Data

(63) Continuation of application No. 18/178,091, filed on Mar. 3, 2023, now Pat. No. 11,832,013, which is a
(Continued)

(30) Foreign Application Priority Data

Nov. 29, 2018    (JP) .................................. 2018-223480

(51) Int. Cl.
*H04N 25/78*        (2023.01)
(52) U.S. Cl.
CPC .................................... *H04N 25/78* (2023.01)
(58) Field of Classification Search
None
See application file for complete search history.

(56) References Cited

U.S. PATENT DOCUMENTS 11,627,268 B2 *    4/2023    Zhu ......................... H04N 25/78
                                                              348/308
11,832,013 B2 *    11/2023    Zhu ......................... H04N 25/47
(Continued)

FOREIGN PATENT DOCUMENTS

JP        2010-510732 A        4/2010
JP        2018-186478 A        11/2018
WO        2018/198691 A1        11/2018

OTHER PUBLICATIONS

Lichtsteiner, et al., "A 128x 128 120 dB 15 μs Latency Asynchronous Temporal Contrast Vision Sensor", IEEE Journal of Solid-State Circuits, vol. 43, No. 02, Feb. 2008, 11 pages.
(Continued)

*Primary Examiner* — Mark T Monk
(74) *Attorney, Agent, or Firm* — CHIP LAW GROUP

(57)        ABSTRACT

Provided is a solid-state image sensor which includes a photoelectric conversion element, a charge accumulation unit, a transfer transistor, a detection unit, and a connection transistor. The photoelectric conversion element generates a charge by photoelectric conversion. The charge accumulation unit accumulates the charge and generates a voltage according to an amount of the charge. The transfer transistor transfers the charge from the photoelectric conversion element to the charge accumulation unit. The detection unit detects whether or not a change amount of a photocurrent according to the amount of the charge exceeds a predetermined threshold. The connection transistor connects the charge accumulation unit and the detection unit to cause the photocurrent to flow.

18 Claims, 37 Drawing Sheets

Related U.S. Application Data continuation of application No. 17/309,344, filed as application No. PCT/JP2019/044097 on Nov. 11, 2019, now Pat. No. 11,627,268.

(56)     References Cited

U.S. PATENT DOCUMENTS

| | | | | |
|---|---|---|---|---|
| 2010/0182468 | A1 | 7/2010 | Posch et al. | |
| 2010/0194956 | A1 | 8/2010 | Yuan et al. | |
| 2015/0042855 | A1* | 2/2015 | Baek ..................... | H10F 39/199 |
| | | | | 348/294 |

OTHER PUBLICATIONS

Notice of Allowance for U.S. Appl. No. 17/309,344, issued on Dec. 12, 2022, 11 pages.
International Search Report and Written Opinion of PCT Application No. PCT/JP2019/044097, issued on Jan. 28, 2020, 06 pages of English Translation and 06 pages of ISRWO.
International Preliminary Report on Patentability of PCT Application No. PCT/JP2019/044097, issued on Jun. 10, 2021, 06 pages of English Translation and 03 pages of IPRP.
Notice of Allowance for U.S. Appl. No. 18/178,091, issued on Jul. 19, 2023, 11 pages.

* cited by examiner

SOLID-STATE IMAGE SENSOR, IMAGING DEVICE, AND METHOD OF CONTROLLING SOLID-STATE IMAGE SENSOR

CROSS REFERENCE TO RELATED APPLICATIONS

The present application is a continuation application of U.S. patent application Ser. No. 18/178,091, filed Mar. 3, 2023, which is a continuation application of U.S. patent application Ser. No. 17/309,344, filed on May 20, 2021, now U.S. Pat. No. 11,627,268, is a U.S. National Phase of International Patent Application No. PCT/JP2019/044097 filed on Nov. 11, 2019, which claims priority benefit of Japanese Patent Application No. JP 2018-223480 filed in the Japan Patent Office on Nov. 29, 2018. Each of the above-referenced applications is hereby incorporated herein by reference in its entirety.

TECHNICAL FIELD

The present technology relates to a solid-state image sensor, an imaging device, and a method of controlling a solid-state image sensor. More specifically, the present technology relates to a solid-state image sensor that detects whether or not a change amount of a light amount has exceeded a threshold, an imaging device, and a method of controlling a solid-state image sensor.

BACKGROUND ART

Conventionally, a synchronous solid-state image sensor for capturing image data (frame) in synchronization with a synchronous signal such as a vertical synchronous signal has been used in an imaging device or the like. The typical synchronous solid-state image sensor can acquire the image data only at each cycle (for example, 1/60 seconds) of the synchronous signal, and is thus difficult to deal with a case where higher-speed processing is required in the fields of transportation, robots, and the like. Therefore, an asynchronous solid-state image sensor provided with a circuit for detecting an address event has been proposed (for example, see Non-Patent Document 1). Here, the address event means that a light amount of a pixel varies at a certain pixel address and the change amount has exceeded a threshold. The address event includes an on-event in which the light amount of the pixel has varied and the change amount has exceeded a predetermined upper limit, and an off-event in which the change amount has fallen below a predetermined lower limit. In the asynchronous solid-state image sensor, two-bit data including a detection result of a one-bit on-event and a detection result of a one-bit off-event is generated for each pixel. Such a solid-state image sensor for detecting an address event for each pixel is called dynamic vision sensor (DVS).

CITATION LIST

Non-Patent Document

Non-Patent Document 1: Patrick Lichtsteiner, et al., A 128 128 120 dB 15 µs Latency Asynchronous Temporal Contrast Vision Sensor, IEEE JOURNAL OF SOLID-STATE CIRCUITS, VOL. 43, NO. 2, FEBRUARY 2008.

SUMMARY OF THE INVENTION

Problems to be Solved by the Invention

The above-described asynchronous solid-state image sensor (DVS) generates data at a much higher speed than the synchronous solid-state image sensor. However, in image recognition or the like, high-quality image data of three bits or more is sometimes required for each pixel, in addition to detection of the presence or absence of an address event, and the above-described DVS for generating two-bit data for each pixel cannot satisfy the request. To capture higher-quality image data, it is only required to provide both the DVS and the synchronous solid-state image sensor. However, it is not desirable as it causes increase in the size, the number of parts, and the cost. As described above, there is a problem that it is difficult to further capture a high-quality image in the solid-state image sensor (DVS) that detects an address event.

The present technology has been made in view of such a situation, and an object is to further capture an image in a solid-state image sensor that detects an address event.

Solutions to Problems

The present technology has been made to solve the above-described problem and the first aspect is a solid-state image sensor and a method of controlling the solid-state image sensor, the solid-state image sensor including a photoelectric conversion element configured to generate a charge by photoelectric conversion, a charge accumulation unit configured to accumulate the charge and generate a voltage according to an amount of the charge, a transfer transistor configured to transfer the charge from the photoelectric conversion element to the charge accumulation unit, a detection unit configured to detect whether or not a change amount of a photocurrent according to the amount of the charge exceeds a predetermined threshold, and a connection transistor configured to connect the charge accumulation unit and the detection unit and allow the photocurrent to flow. This brings about an effect that either detection of an address event or capture of image data is executed.

Furthermore, in the first aspect, the photoelectric conversion element, the charge accumulation unit, and the connection transistor can be arranged in each of a predetermined number of pixels, and the predetermined number of pixels can share the detection unit. This brings about an effect that a circuit scale is reduced.

Furthermore, in the first aspect, the photoelectric conversion element and the transfer transistor can be arranged in each of a predetermined number of pixels, and the predetermined number of pixels can share the charge accumulation unit. This brings about an effect that a circuit scale is reduced.

Furthermore, in the first aspect, the connection transistor may transition to a close state to connect the charge accumulation unit and the detection unit in a case where a predetermined detection mode for detecting whether or not the change amount exceeds the threshold is set, and connect the charge accumulation unit and the detection unit for a first pulse period before the charge is transferred in a case where a predetermined imaging mode for capturing image data is set. This brings about an effect that the charge accumulation unit is initialized by the connection transistor in the imaging mode.

Furthermore, in the first aspect, a reset transistor for initializing the charge accumulation unit may be further included. This brings about an effect that the charge accumulation unit is initialized by the reset transistor in the imaging mode.

Furthermore, in the first aspect, the connection transistor may transition to a close state to connect the charge accumulation unit and the detection unit in a case where a predetermined detection mode for detecting whether or not the change amount exceeds the threshold is set, and transition to an open state in a case where a predetermined imaging mode for capturing image data is set, and the reset transistor may initialize the charge accumulation unit over a predetermined reset period in the case where the imaging mode is set. This brings about an effect that the charge accumulation unit is initialized by the reset transistor at predetermined timing in the imaging mode.

Furthermore, in the first aspect, a conversion efficiency control transistor configured to control conversion efficiency for converting the charge into the voltage may be further included. This brings about an effect that the conversion efficiency is controlled.

Furthermore, in the first aspect, the connection transistor may transition to a close state to connect the charge accumulation unit and the detection unit in a case where a predetermined detection mode for detecting whether or not the change amount exceeds the threshold is set, and connect the charge accumulation unit and the detection unit over a predetermined reset period in a case where a predetermined imaging mode for capturing image data is set, and the conversion efficiency control transistor may control the conversion efficiency within a transfer period in which the charge is transferred in the case where the imaging mode is set. This brings about an effect that the conversion efficiency is controlled in the imaging mode.

Furthermore, in the first aspect, a reset transistor configured to initialize the charge accumulation unit, and a conversion efficiency control transistor configured to control conversion efficiency for converting the charge into the voltage may be further included. This brings about an effect that the charge accumulation unit is initialized by the reset transistor and the conversion efficiency is controlled.

Furthermore, in the first aspect, the connection transistor may transition to a close state to connect the charge accumulation unit and the detection unit in a case where a predetermined detection mode for detecting whether or not the change amount exceeds the threshold is set, and transition to an open state in a case where a predetermined imaging mode for capturing image data is set, the reset transistor may initialize the charge accumulation unit within a predetermined reset period in the case where the imaging mode is set, and the conversion efficiency control transistor may control the conversion efficiency within a transfer period in which the charge is transferred in the case where the imaging mode is set. This brings about an effect that the charge accumulation unit is initialized by the reset transistor at predetermined timing in the imaging mode, and the conversion efficiency is controlled.

Furthermore, in the first aspect, a readout circuit configured to amplify and output a difference between signals according to the voltages of a pair of pixels may be further included, and the photoelectric conversion element, the charge accumulation unit, and the connection transistor may be arranged in each of the pair of pixels. This brings about an effect that a signal amplified with a high gain is read out.

Furthermore, in the first aspect, the transfer transistor may include first and second transfer transistors, the first transfer transistor may be arranged in one of the pair of pixels and the second transfer transistor may be arranged in the other of the pair of pixels, and one of the first and second transfer transistors may transfer the charge and the other transfer transistor may be in an off state during transfer by the one transfer transistor. This brings about an effect that a differentially amplified signal is read out by the control of the transfer transistor.

Furthermore, in the first aspect, the readout circuit may include a predetermined number of unit readout circuits, and each of the unit readout circuits may include a current source, a current mirror circuit, a first switch that connects the current sources of the predetermined number of unit readout circuits, and a second switch that connects the current mirror circuits of the predetermined number of unit readout circuits. This brings about an effect that noise is suppressed.

Furthermore, in the first aspect, an analog-digital converter configured to convert an analog signal according to the voltage into a digital signal may be further included, and the photoelectric conversion element, the charge accumulation unit, the transfer transistor, the detection unit, the connection transistor, and the analog-digital converter may be arranged in each of a plurality of pixels. This brings about an effect that a readout speed is improved.

Furthermore, the second aspect of the present technology is an imaging device including a photoelectric conversion element configured to generate a charge by photoelectric conversion, a charge accumulation unit configured to accumulate the charge and generate a voltage according to an amount of the charge, a transfer transistor configured to transfer the charge from the photoelectric conversion element to the charge accumulation unit, a detection unit configured to detect whether or not a change amount of a photocurrent according to the amount of the charge exceeds a predetermined threshold, a connection transistor configured to connect the charge accumulation unit and the detection unit and allow the photocurrent to flow, and a digital signal processing unit configured to process a digital signal obtained by performing analog-digital conversion for an analog signal according to the voltage. This brings about an effect that either detection of an address event or readout and capture of image data is executed.

MODE FOR CARRYING OUT THE INVENTION

Hereinafter, modes for implementing the present technology (hereinafter referred to as embodiments) will be described. Description will be given according to the following order.

1. First Embodiment (an example of connecting a floating diffusion layer and an address event detection unit)
2. Second Embodiment (an example of connecting a floating diffusion layer and a shared address event detection unit)
3. Third Embodiment (an example of connecting a shared floating diffusion layer and an address event detection unit)
4. Fourth Embodiment (an example of adding a reset transistor and connecting a floating diffusion layer and an address event detection unit)
5. Fifth Embodiment (an example of adding a conversion efficiency control transistor and connecting a floating diffusion layer and an address event detection unit)
6. Sixth Embodiment (an example of adding a reset transistor and a conversion efficiency control transistor and connecting a floating diffusion layer and an address event detection unit)

7. Seventh Embodiment (an example of adding a circuit for differential readout and connecting a floating diffusion layer and an address event detection unit)

8. Eighth Embodiment (an example of horizontally connecting circuits for differential readout and connecting a floating diffusion layer and an address event detection unit)

9. Ninth Embodiment (an example of arranging an analog-digital converter for each pixel and connecting a floating diffusion layer and an address event detection unit)

10. Applications to Moving Bodies

1. First Embodiment

[Configuration Example of Imaging Device]

Figure 1:
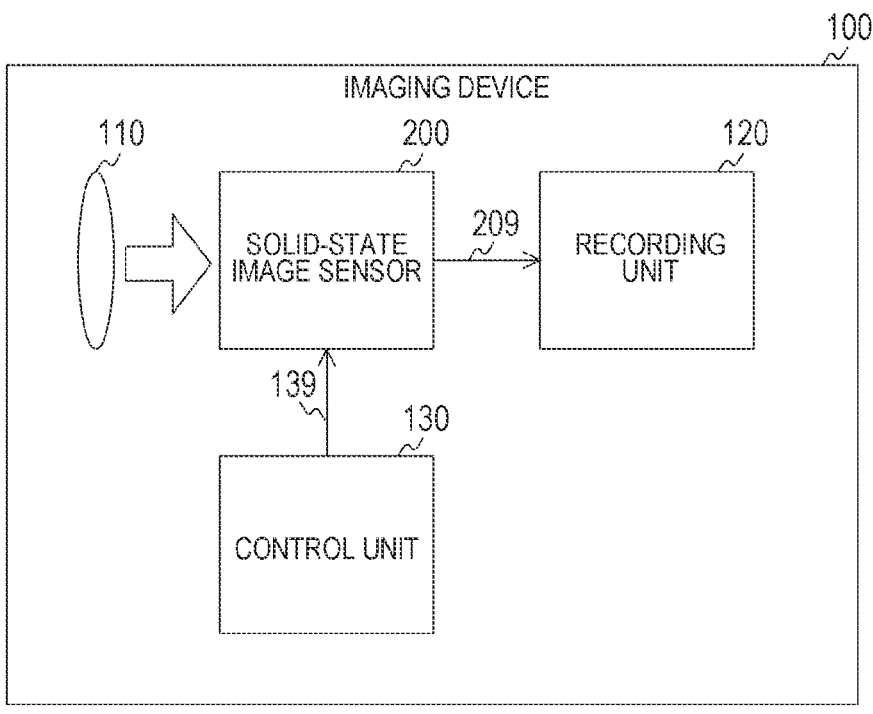
FIG. 1 is a block diagram illustrating a configuration example of an imaging device according to a first embodiment of the present technology.

FIG. 1 is a block diagram illustrating a configuration example of an imaging device 100 according to a first embodiment of the present technology. The imaging device 100 includes an imaging lens 110, a solid-state image sensor 200, a recording unit 120, and a control unit 130. As the imaging device 100, a camera mounted on an industrial robot, an in-vehicle camera, or the like is assumed.

The imaging lens 110 condenses incident light and guides the incident light to the solid-state image sensor 200. The solid-state image sensor 200 captures image data and detects presence or absence of an address event. Here, the address event includes an on-event and an off-event, and a detection result of the address event includes a one-bit on-event detection result and a one-bit off-event detection result. The on-event means that a change amount of an incident light amount has exceeded a predetermined upper limit threshold. Meanwhile, the off-event means that the change amount of the light amount has fallen below a predetermined lower limit threshold. The solid-state image sensor 200 processes the detection result of the address event and outputs data indicating a processing result and the image data to the recording unit 120 via a signal line 209. Note that the solid-state image sensor 200 may detect only one of the on-event and the off-event.

The recording unit 120 records the data from the solid-state image sensor 200. The control unit 130 controls the solid-state image sensor 200 to capture image data and detect the presence or absence of an address event.

[Configuration Example of Solid-State Image Sensor]

Figure 2:
FIG. 2 is a diagram illustrating an example of a stacked structure of a solid-state image sensor according to the first embodiment of the present technology.
Figure 2:
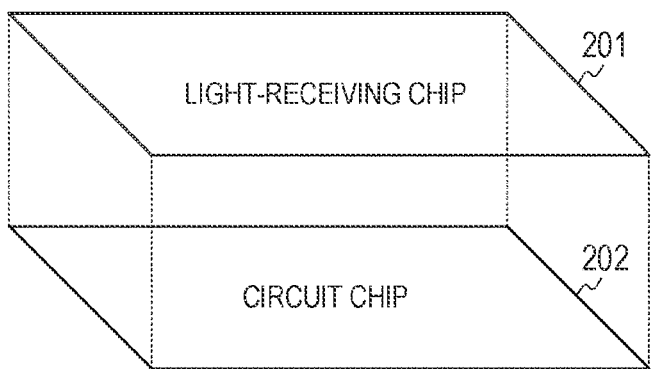

FIG. 2 is a diagram illustrating an example of a stacked structure of the solid-state image sensor 200 according to the first embodiment of the present technology. The solid-state image sensor 200 includes a circuit chip 202 and a light-receiving chip 201 stacked on the circuit chip 202. These chips are electrically connected via a connection part such as a via. Note that Cu—Cu bonding or bump can be used for connection in addition to the via.

Figure 3:
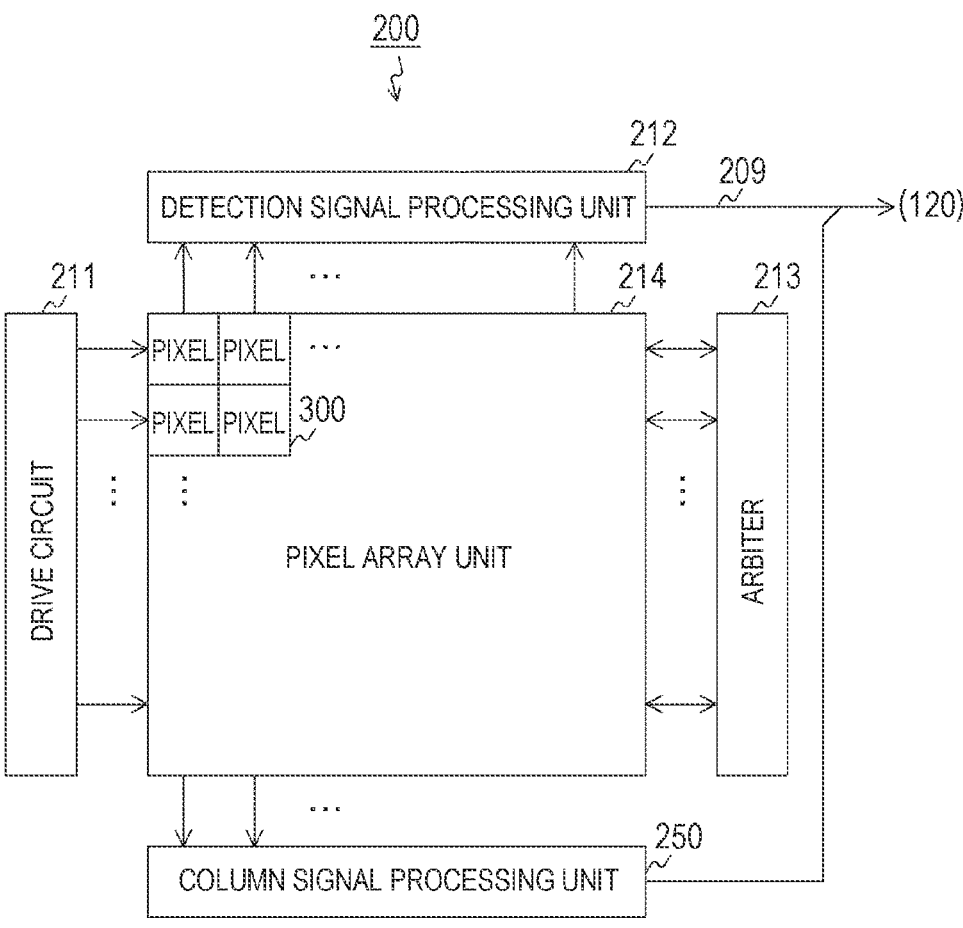
FIG. 3 is a block diagram illustrating a configuration example of the solid-state image sensor according to the first embodiment of the present technology.

FIG. 3 is a block diagram illustrating a configuration example of the solid-state image sensor 200 according to the first embodiment of the present technology. The solid-state image sensor 200 includes a drive circuit 211, a detection signal processing unit 212, an arbiter 213, a pixel array unit 214, and a column signal processing unit 250.

Here, the solid-state image sensor 200 is set to any one of a plurality of modes including a detection mode and an imaging mode. The detection mode is a mode for detecting the presence or absence of an address event without capturing image data. Meanwhile, the imaging mode is a mode for capturing image data without detecting an address event.

In the pixel array unit 214, a plurality of pixels 300 is arrayed in a two-dimensional lattice manner. Hereinafter, a set of the pixels 300 arrayed in a horizontal direction is referred to as a "row", and a set of the pixels 300 arrayed in a direction perpendicular to the row is referred to as a "column".

The pixel 300 detects the presence or absence of an address event and generates an analog pixel signal. When detecting the presence or absence of an address event, the pixel 300 supplies a detection signal indicating a detection result to the detection signal processing unit 212. Meanwhile, when generating the pixel signal, the pixel 300 outputs the pixel signal to the column signal processing unit 250.

The drive circuit 211 drives the pixel 300 to output either the detection signal or the pixel signal. The drive circuit 211 causes each of the pixels 300 to detect the presence or absence of an address event in a case where the detection mode is set. Meanwhile, in a case where the imaging mode is set, the drive circuit 211 selects and exposes rows in order to generate the pixel signal.

The arbiter 213 arbitrates requests from the pixel array unit 214, and transmits a response to the pixel array unit 214 on the basis of an arbitration result.

The detection signal processing unit 212 executes predetermined signal processing such as image recognition processing for the detection signal from the pixel array unit 214. The detection signal processing unit 212 supplies data indicating a processing result to the recording unit 120 via the signal line 209.

The column signal processing unit 250 performs analog to digital (AD) conversion processing of converting the pixel signal from the pixel array unit 214 into a digital signal. The column signal processing unit 250 performs various types of signal processing such as CDS processing and dark current correction as necessary in addition to the AD conversion processing, and supplies image data including the processed digital signal to the recording unit 120.

[Configuration Example of Pixel]

Figure 4:
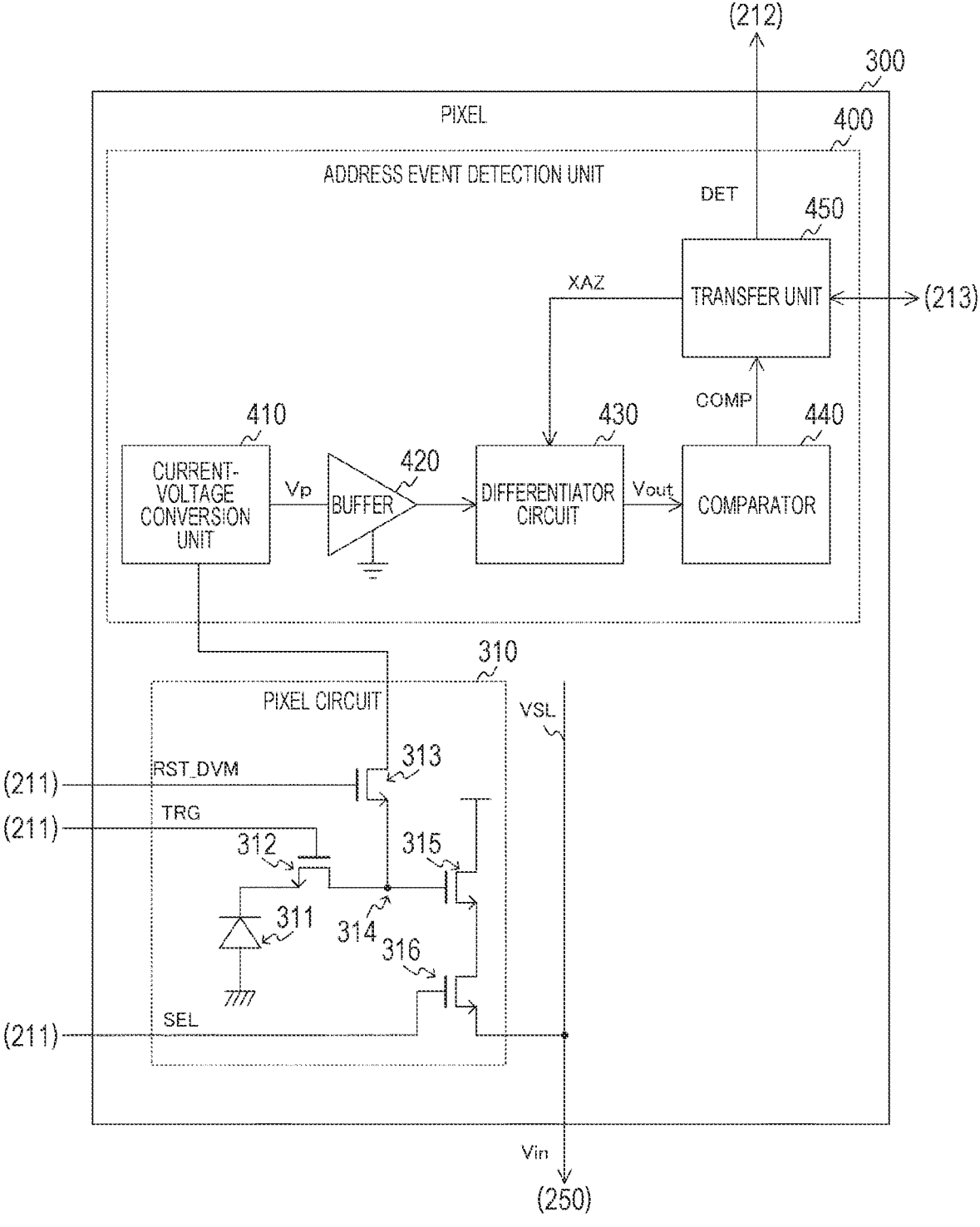
FIG. 4 is a block diagram illustrating a configuration example of a pixel according to the first embodiment of the present technology.

FIG. 4 is a block diagram illustrating a configuration example of the pixel 300 according to the first embodiment of the present technology. The pixel 300 includes a pixel circuit 310 and an address event detection unit 400.

The pixel circuit 310 generates the pixel signal and includes a photoelectric conversion element 311, a transfer transistor 312, a connection transistor 313, a floating diffusion layer 314, an amplification transistor 315, and a selection transistor 316. As the transistors in the pixel circuit 310, for example, an N-type metal-oxide-semiconductor (MOS) transistor is used.

The photoelectric conversion element 311 generates a charge by photoelectric conversion for incident light. The transfer transistor 312 transfers the charge from the photoelectric conversion element 311 to the floating diffusion layer 314 according to a transfer signal TRG from the drive circuit 211.

The connection transistor 313 connects the address event detection unit 400 and the floating diffusion layer 314 according to a control signal RST_DVM from the drive circuit 211, and allows a photocurrent to flow.

The floating diffusion layer 314 accumulates the transferred charge and generates a voltage according to the amount of accumulated charge. Note that the floating diffusion layer 314 is an example of a charge accumulation unit described in claims.

The amplification transistor 315 amplifies the voltage of the floating diffusion layer 314 and supplies the amplified voltage as a pixel signal to the selection transistor 316. The selection transistor 316 supplies a pixel signal Vin to the column signal processing unit 250 via a vertical signal line VSL according to a selection signal SEL from the drive circuit 211. The vertical signal line VSL is wired for each column along the column direction in the pixel array unit 214.

The address event detection unit 400 detects whether or not a change amount of a photocurrent according to a light amount exceeds a predetermined threshold (in other words, the presence or absence of an address event). The address event detection unit 400 includes a current-voltage conversion unit 410, a buffer 420, a differentiator circuit 430, and a comparator 440. Note that the address event detection unit 400 is an example of a detection unit described in the claims.

The current-voltage conversion unit 410 converts the photocurrent into a pixel voltage Vp. For example, the photocurrent is logarithmically converted. The current-voltage conversion unit 410 supplies the pixel voltage Vp to the buffer 420.

The buffer 420 outputs the pixel voltage Vp from the current-voltage conversion unit 410 to the differentiator circuit 430. The buffer 420 can improve a drive force for driving a rear stage. Furthermore, the buffer 420 can secure isolation of noise associated with a rear-stage switching operation.

The differentiator circuit 430 obtains the change amount of the pixel voltage Vp by differential operation. The change amount of the pixel voltage Vp indicates the change amount of the light amount. The differentiator circuit 430 supplies a differential signal Vout indicating the change amount of the light amount to the comparator 440.

The comparator 440 compares the differential signal Vout with the predetermined threshold (upper limit threshold or lower limit threshold). A comparison result COMP of the comparator 440 indicates the detection result of the address event. The comparator 440 supplies the comparison result COMP to the transfer unit 450.

The transfer unit 450 transfers a detection signal DET and supplies an auto-zero signal XAZ to the differentiator circuit 430 for initialization after the transfer. The transfer unit 450 supplies a request for requesting transfer of the detection signal DET to the arbiter 213 when the address event is detected. Then, when receiving a response to the request, the transfer unit 450 supplies the comparison result COMP as the detection signal DET to the detection signal processing unit 212 and supplies the auto-zero signal XAZ to the differentiator circuit 430.

By providing the address event detection unit 400 and the pixel circuit 310 for each pixel, the solid-state image sensor 200 can capture image data including a pixel value according to the light amount while implementing the DVS function. It is conceivable to separately mount a DVS provided with only the address event detection unit 400 for each pixel and a solid-state image sensor provided with only the pixel circuit 310 for each pixel, but this configuration is not favorable. This is because the circuit scale and cost increase, and data obtained by the DVS and data obtained by the solid-state image sensor have a gap due to a difference in mounting positions of two solid-state image sensors.

[Configuration Example of Address Detection Unit]

Figure 5:
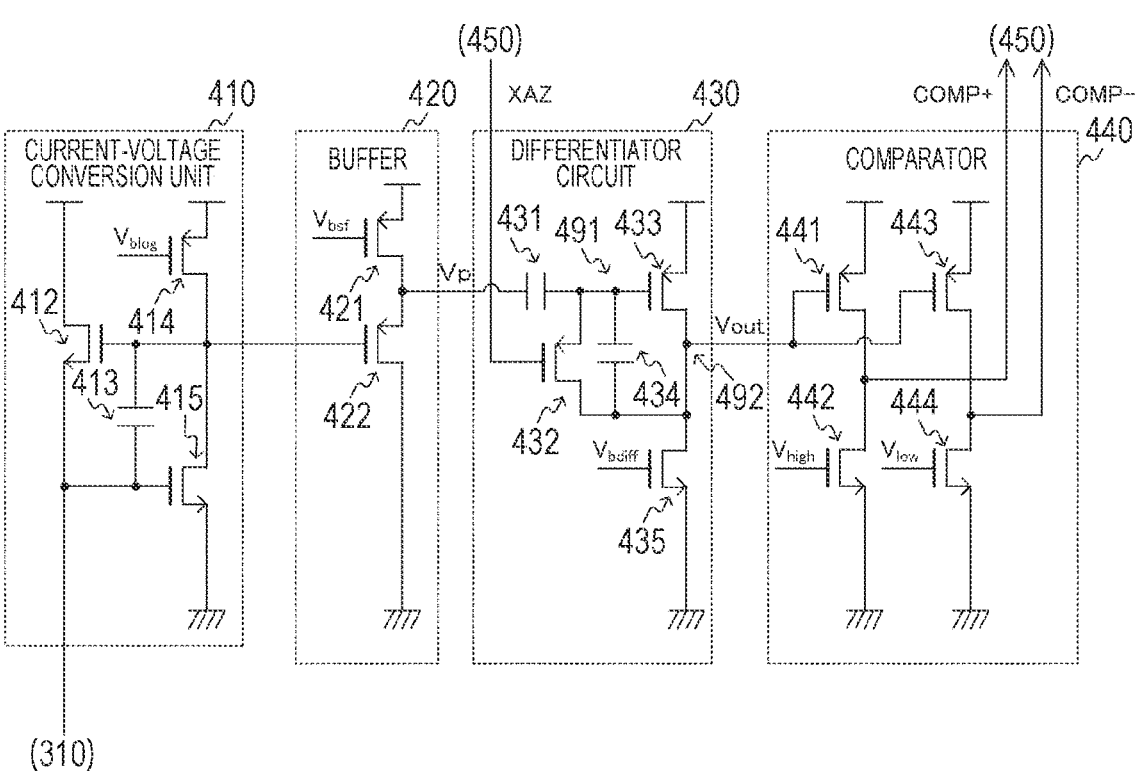
FIG. 5 is a circuit diagram illustrating a configuration example of a current-voltage conversion unit, a buffer, a differentiator circuit, and a comparator according to the first embodiment of the present technology.

FIG. 5 is a circuit diagram illustrating a configuration example of the current-voltage conversion unit 410, the buffer 420, the differentiator circuit 430, and the comparator 440 according to the first embodiment of the present technology.

The current-voltage conversion unit 410 includes N-type transistors 412 and 415, a capacitance 413, and a P-type transistor 414. Metal-oxide-semiconductor (MOS) transistors are used as the N-type transistor 412, the P-type transistor 414, and the N-type transistor 415, for example.

A source of the N-type transistor 412 is connected to the pixel circuit 310 and a drain of the N-type transistor 412 is connected to a power supply terminal. The P-type transistor 414 and the N-type transistor 415 are connected in series between the power supply terminal and a reference terminal having a predetermined reference potential (ground potential or the like). Furthermore, a connection point between the P-type transistor 414 and the N-type transistor 415 is connected to a gate of the N-type transistor 412 and an input terminal of the buffer 420. A connection point between the N-type transistor 412 and the pixel circuit 310 is connected to a gate of the N-type transistor 415.

Furthermore, a predetermined bias voltage $V_{blog}$ is applied to a gate of the P-type transistor 414. The capacitance 413 is inserted between the gate of the N-type transistor 412 and the gate of the N-type transistor 415.

Furthermore, for example, the pixel circuit 310 is arranged on the light-receiving chip 201, and a rear-stage circuit is arranged on the circuit chip 202. Note that the circuits and elements arranged on the light-receiving chip 201 and the circuit chip 202 are not limited to this configuration.

The buffer 420 includes P-type transistors 421 and 422. For example, a MOS transistor is used as the transistors.

In the buffer 420, the P-type transistors 421 and 422 are connected in series between the power supply terminal and the reference potential terminal. Furthermore, a gate of the P-type transistor 422 is connected to the current-voltage conversion unit 410, and a connection point of the P-type transistors 421 and 422 is connected to the differentiator circuit 430. A predetermined bias voltage $V_{bsf}$ is applied to a gate of the P-type transistor 421.

The differentiator circuit 430 includes capacitances 431 and 434, P-type transistors 432 and 433, and an N-type transistor 435. For example, a MOS transistor is used as transistors in the differentiator circuit 430, for example.

The P-type transistor 433 and the N-type transistor 435 are connected in series between the power supply terminal and the reference potential terminal. A predetermined bias voltage $V_{bdiff}$ is input to a gate of the N-type transistor 435. These transistors function as an inverting circuit having the gate of the P-type transistor 433 as an input terminal 491 and the connection point of the P-type transistor 433 and the N-type transistor 435 as an output terminal 492.

The capacitance 431 is inserted between the buffer 420 and the input terminal 491. The capacitance 431 supplies a current according to time derivative of (in other words, the change amount in) the pixel voltage Vp from the buffer 420 to the input terminal 491. Furthermore, the capacitance 434 is inserted between the input terminal 491 and the output terminal 492.

The P-type transistor 432 opens or closes a path between the input terminal 491 and the output terminal 492 according to the auto-zero signal XAZ from the transfer unit 450. For example, when the low-level auto-zero signal XAZ is input, the P-type transistor 432 transitions to the on state according to the auto-zero signal XAZ and sets the differential signal Vout to the initial value.

The comparator 440 includes P-type transistors 441 and 443 and N-type transistors 442 and 444. For example, a MOS transistor is used as the transistors.

In the comparator 440, the P-type transistor 441 and the N-type transistor 442 are connected in series between the power supply terminal and the reference terminal, and the P-type transistor 443 and the N-type transistor 444 are also connected in series between the power supply terminal and the reference terminal. Furthermore, gates of the P-type transistors 441 and 443 are connected to the differentiator circuit 430. An upper limit voltage $V_{high}$ indicating an upper limit threshold is applied to a gate of the N-type transistor 442, and a lower limit voltage $V_{low}$ indicating a lower limit threshold is applied to a gate of the N-type transistor 444.

A connection point of the P-type transistor 441 and the N-type transistor 442 is connected to the transfer unit 450, and a voltage at this connection point is output as a comparison result COMP+ with respect to the upper limit threshold. A connection point of the P-type transistor 443 and the N-type transistor 444 is connected to the transfer unit 450, and a voltage at this connection point is output as a comparison result COMP− with respect to the lower limit threshold. With such a connection, the comparator 440 outputs the high-level comparison result COMP+ in a case where the differential signal Vout is higher than the upper limit voltage $V_{high}$, and outputs the low-level comparison result COMP− in a case where the differential signal Vout is lower than the lower limit voltage $V_{low}$. The comparison result COMP is a signal including these comparison results COMP+ and COMP−.

Note that the comparator 440 compares both the upper limit threshold and the lower limit threshold with the differential signal Vout. However, the comparator 440 may compare only one of the upper limit threshold and the lower limit threshold with the differential signal Vout. In this case, unnecessary transistors can be eliminated. For example, when comparing the differential signal Vout only with the upper limit threshold, only the P-type transistor 441 and the N-type transistor 442 are arranged. Furthermore, the capacitance 434 is arranged in the differentiator circuit 430, but the capacitance 434 can be reduced.

[Configuration Example of Column Signal Processing Unit]

Figure 6:
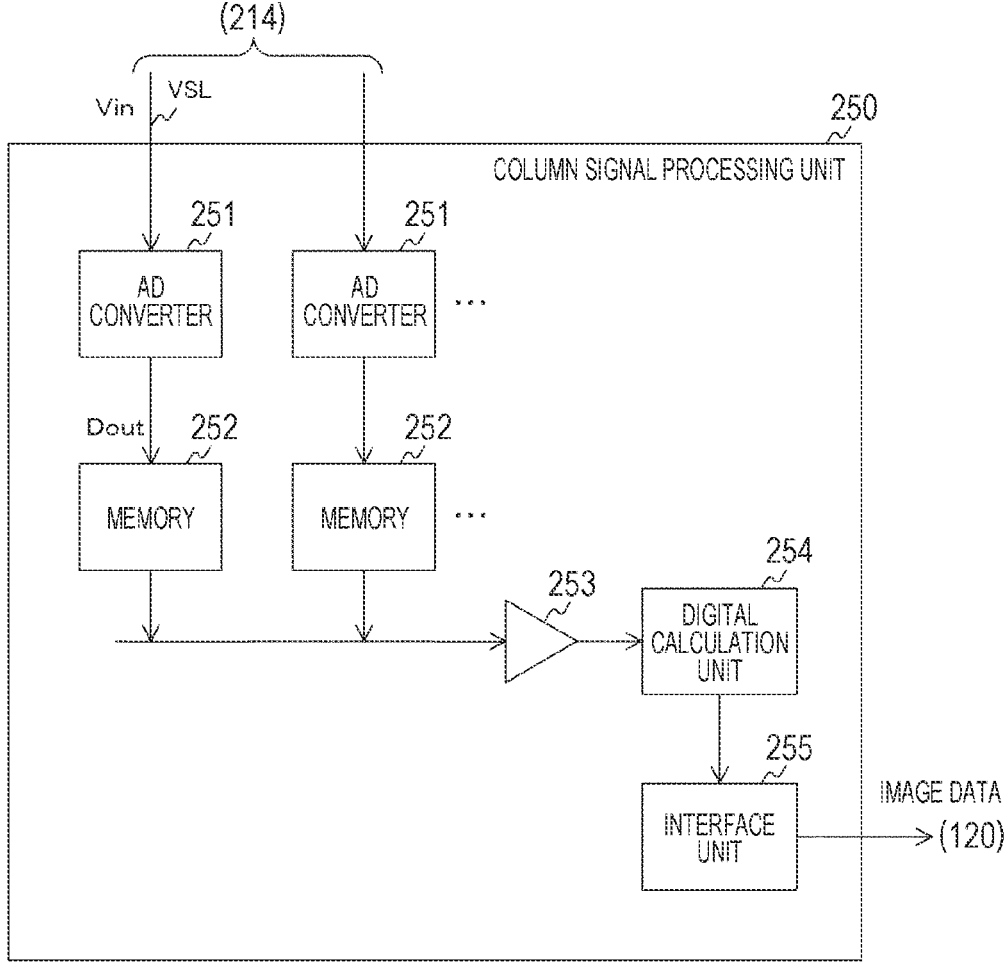
FIG. 6 is a block diagram illustrating a configuration example of a column signal processing unit according to the first embodiment of the present technology.

FIG. 6 is a block diagram illustrating a configuration example of the column signal processing unit 250 according to the first embodiment of the present technology. The column signal processing unit 250 includes a plurality of AD converters 251, a plurality of memories 252, an output unit 253, a digital calculation unit 254, and an interface unit 255. The AD converter 251 and the memory 252 are arranged for each column. Y AD converters 251 and Y memories 252 are arranged where the number of columns is Y (Y is an integer).

The AD converter 251 performs AD conversion processing and CDS processing for the analog pixel signal Vin of a corresponding column. The AD converter 251 causes the corresponding memory 252 to store a processed digital signal Dout. Note that the AD converter 251 may perform only the AD conversion processing and a subsequent circuit may perform the CDS processing.

The memory 252 stores the digital signal Dout. The output unit 253 reads out the digital signal Dout stored in the memory 252 in order and outputs the digital signal Dout to the digital calculation unit 254.

The digital calculation unit 254 performs predetermined signal processing such as dark current correction processing and demosaic processing for the digital signal Dout. The digital calculation unit 254 supplies image data including the processed pixel signal to the interface unit 255.

The interface unit 255 outputs the image data from the digital calculation unit 254 to the recording unit 120.

[Operation Example of Solid-State Image Sensor]

Figure 7:
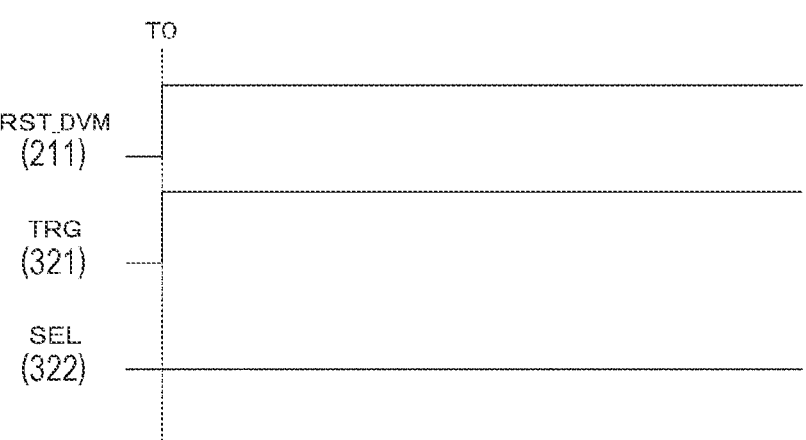
FIG. 7 is a timing chart illustrating an example of an operation of the solid-state image sensor in a detection mode according to the first embodiment of the present technology.

FIG. 7 is a timing chart illustrating an example of an operation of the solid-state image sensor 200 in the detection mode according to the first embodiment of the present technology. For example, when the detection mode is set at timing TO, the drive circuit 211 sets the control signal RST_DVM and the transfer signal TRG to the high level. Meanwhile, in the detection mode, the selection signal SEL is controlled to, for example, the low level.

Both the connection transistor 313 and the transfer transistor 312 transition to the close state by the high-level control signal RST_DVM and transfer signal TRG. As a result, the address event detection unit 400 and the floating diffusion layer 314 are connected, and the photocurrent flows through the connection transistor 313 and the transfer transistor 312. Then, the address event detection unit 400 compares the change amount of the photocurrent with a threshold to detect the presence or absence of an address event.

Figure 8:
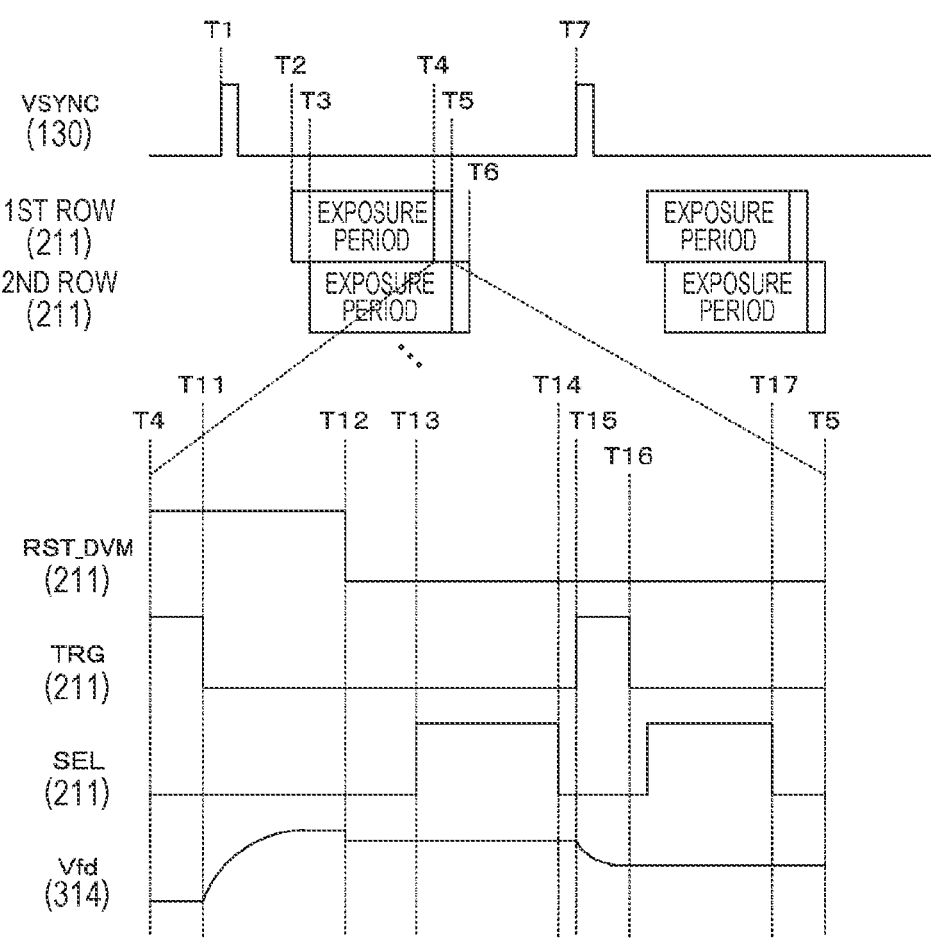
FIG. 8 is a timing chart illustrating an example of an operation of the solid-state image sensor in an imaging mode according to the first embodiment of the present technology.

FIG. 8 is a timing chart illustrating an example of an operation of the solid-state image sensor 200 in the imaging mode according to the first embodiment of the present technology.

The control unit 130 supplies a vertical synchronous signal VSYNC. The vertical synchronous signal VSYNC rises at, for example, timing T1 and next rises at timing T7.

The drive circuit 211 performs rolling shutter control for selecting and exposing rows in order. For example, the drive circuit 211 starts exposure of the first row at timing T2 and starts exposure of the second row at timing T3.

Furthermore, the drive circuit 211 causes the column signal processing unit 250 to perform AD conversion (in other words, readout) of the pixel signal at termination of the exposure. For example, the drive circuit 211 causes the column signal processing unit 250 to read out the first row at timing T4 to T5 at the termination of the exposure of the first row, and to read out the second row at timing T5 to T6 at the termination of the exposure of the second row.

In a readout period such as the timing T4 to T5, the drive circuit 211 supplies the high-level control signal RST_DVM over the reset period from the predetermined timing T11 to T12 to initialize the floating diffusion layer 314. Thereby, a reset level obtained by amplifying a potential Vfd of the floating diffusion layer 314 at the initialization is generated. Then, the drive circuit 211 sets the selection signal SEL to the high level in a conversion period from the timing T13 to T14. In this period, the column signal processing unit 250 performs AD conversion for the reset level.

Next, the drive circuit 211 supplies the high-level transfer signal TRG over a transfer period from timing T15 to T16 to transfer the charge to the floating diffusion layer 314. Thereby, a signal level obtained by amplifying the potential Vfd of the floating diffusion layer 314 according to an exposure amount is generated. Then, the drive circuit 211 sets the selection signal SEL to the high level in the conversion period from the timing T17 to T18. In this period, the column signal processing unit 250 performs AD conversion for the signal level and performs the CDS processing.

Figure 9:
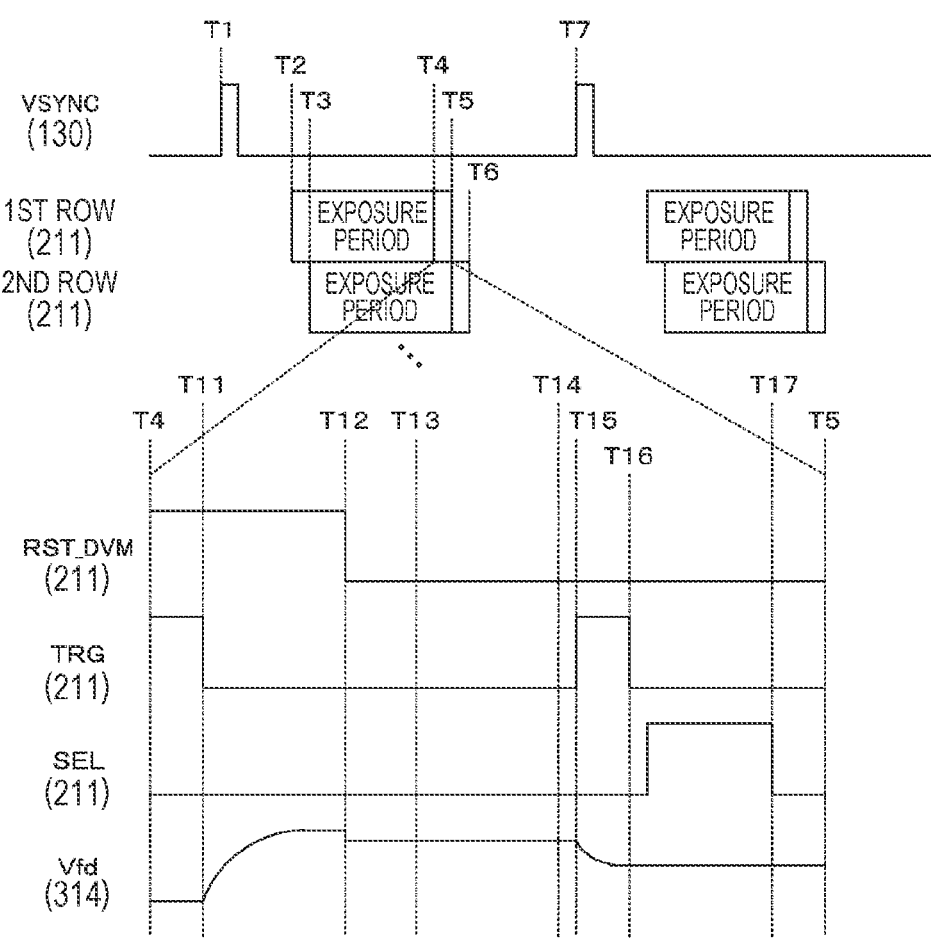
FIG. 9 is a timing chart illustrating an example of an operation of the solid-state image sensor in the imaging mode in a case of not performing correlated double sampling (CDS) processing according to the first embodiment of the present technology.

Note that the column signal processing unit 250 performs the CDS processing but can be configured no to perform the CDS processing. In this case, as illustrated in FIG. 9, the selection signal SEL is set to the low level and the reset level is not converted until timing T14.

Figure 10:
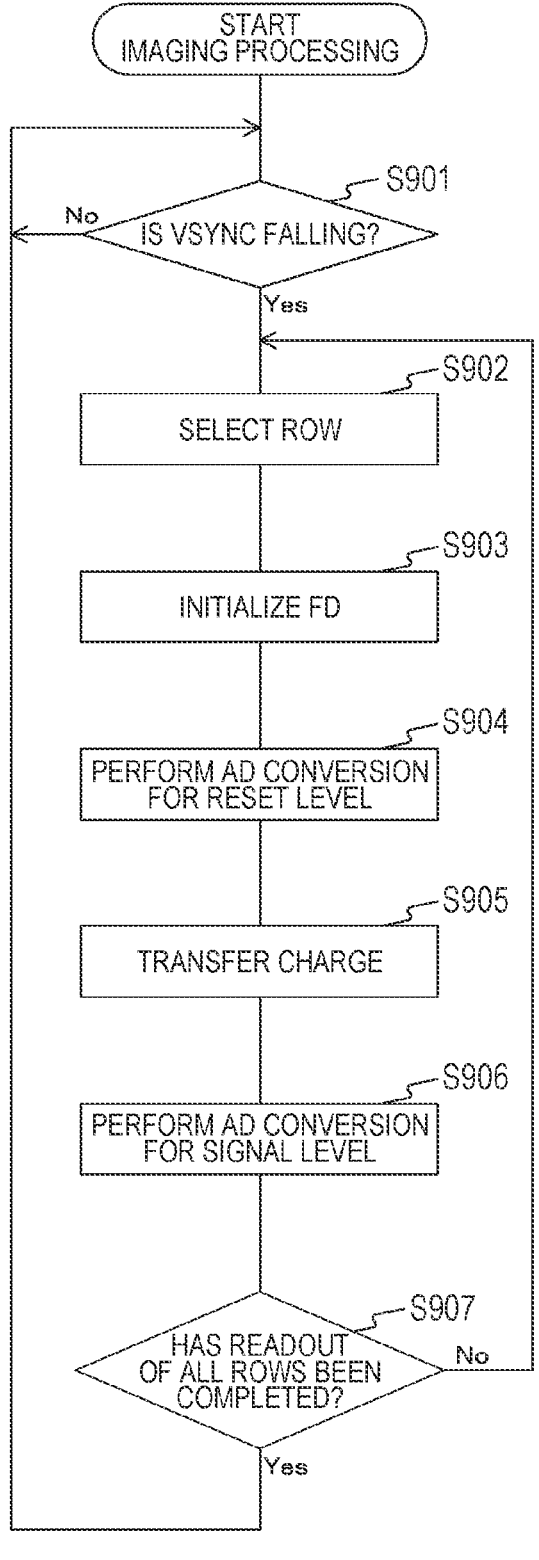
FIG. 10 is a flowchart illustrating an example of imaging processing according to the first embodiment of the present technology.

FIG. 10 is a flowchart illustrating an example of the imaging processing according to the first embodiment of the present technology. The imaging processing is started when, for example, a predetermined application for capturing image data is executed.

The drive circuit 211 in the solid-state image sensor 200 determines whether or not it is falling timing of a vertical synchronous signal VSYNC (step S901). In a case where it is the falling timing of VSYNC (step S901: Yes), the drive circuit 211 selects one of the rows (step S902). The drive circuit 211 initializes the floating diffusion layer 314 (FD: floating diffusion) of the selected row by the control signal RST_DVM (step S903). The column signal processing unit 250 performs AD conversion for the reset level (step S904).

Then, the drive circuit 211 supplies the transfer signal TRG to the selected row to transfer the charge to the floating diffusion layer 314 (FD) (step S905). The column signal processing unit 250 performs AD conversion for the signal level (step S906).

The drive circuit 211 determines whether or not the AD conversion (that is, readout) of all the rows has been completed (step S907). In a case where the readout of all the rows has not been completed (step S907: No), the drive circuit 211 repeats the processing of step S902 and the subsequent steps.

On the other hand, in a case where the readout of all the rows has been completed (step S907: Yes), the solid-state image sensor 200 repeatedly executes the processing of step S901 and the subsequent steps.

Figure 11:
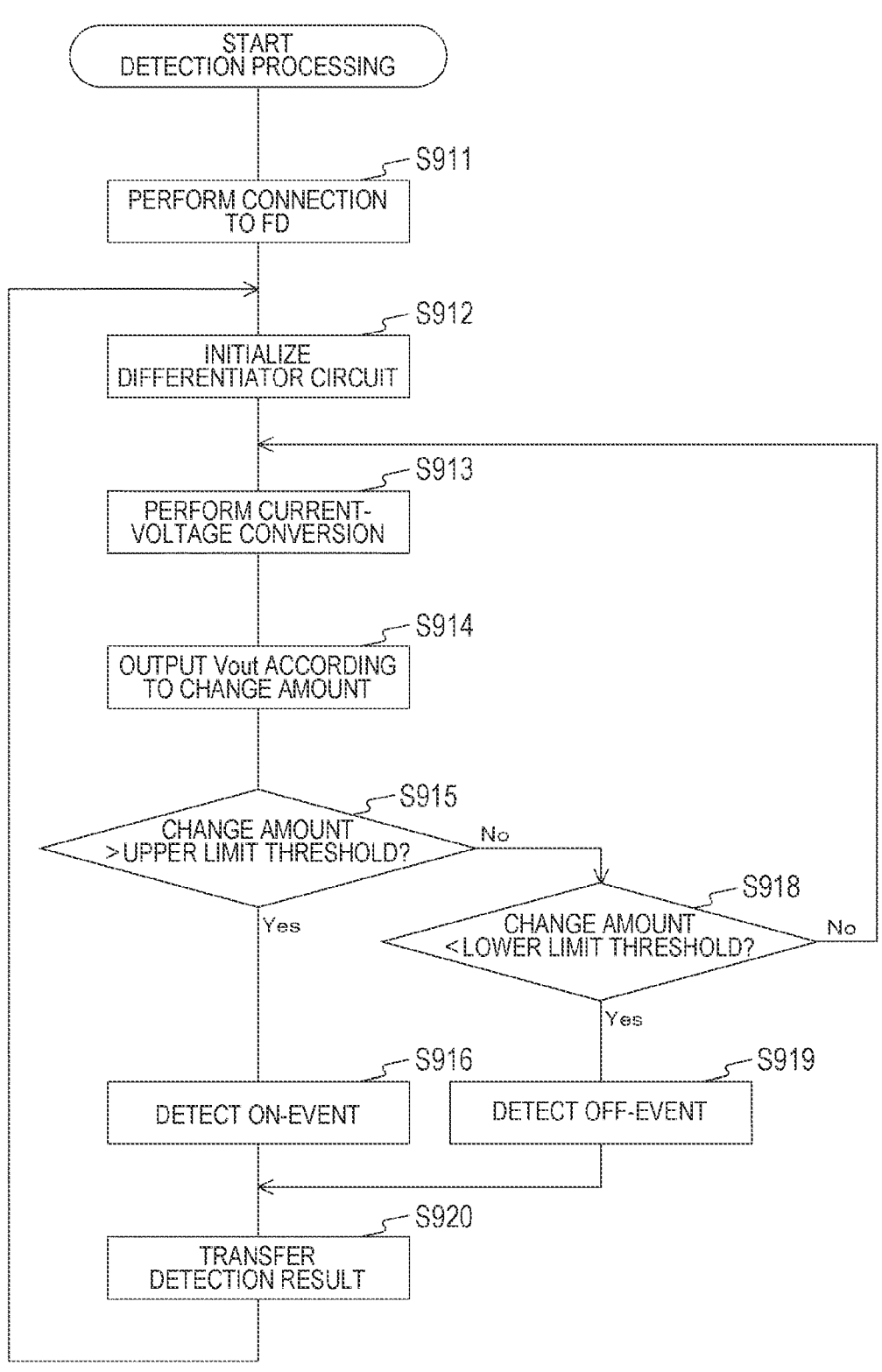
FIG. 11 is a flowchart illustrating an example of detection processing according to the first embodiment of the present technology.

FIG. 11 is a flowchart illustrating an example of detection processing according to the first embodiment of the present technology. This operation is started when, for example, a predetermined application for detecting an address event is executed.

The drive circuit 211 supplies the high-level transfer signal TRG and control signal RST_DVM to all the pixels to connect the floating diffusion layer 314 and the address event detection unit 400 (step S911). Then, the drive circuit 211 initializes the differentiator circuit 430 (step S912).

The current-voltage conversion unit 410 converts the photocurrent into the pixel voltage Vp (step S913). The differentiator circuit 430 outputs the differential signal Vout according to the change amount of the pixel voltage Vp (step S914).

The comparator 440 determines whether or not the differential signal Vout (change amount) exceeds the upper limit threshold (step S915). In a case where the change amount exceeds the upper limit threshold (step S915: Yes), the address event detection unit 400 detects an on-event (step S916).

In a case where the change amount is equal to or less than the upper limit threshold (step S915: No), the comparator 440 determines whether or not the change amount falls below the lower limit threshold (step S918). In a case where the change amount falls below the lower limit threshold (step S918: Yes), the address event detection unit 400 detects an off-event (step S919).

In a case where the change amount is equal to or larger than the lower limit threshold (step S918: No), the address event detection unit 400 repeats step S913 and the subsequent steps. Furthermore, after steps S916 and S917, the transfer unit 450 transfers the detection result (step S920). After step S920, the solid-state image sensor 200 repeatedly executes step S912 and the subsequent steps. The second and subsequent initializations of the differentiator circuit 430 are executed by the transfer unit 450.

As described above, according to the first embodiment of the present technology, the address event detection unit 400 and the floating diffusion layer 314 in the pixel circuit 310 are connected by the connection transistor 313. Therefore, detection of the presence or absence of an address event and output of the analog pixel signal can be performed. Thereby, capture of image data can be performed in addition to the detection of the presence or absence of an address event.

2. Second Embodiment

In the above-described first embodiment, the address event detection unit 400 has been arranged for each pixel. However, the circuit scale of the pixel array unit 214 increases as the number of pixels increases. A solid-state image sensor 200 according to a second embodiment is different from that of the first embodiment in that a plurality of pixels shares one address event detection unit 400.

Figure 12:
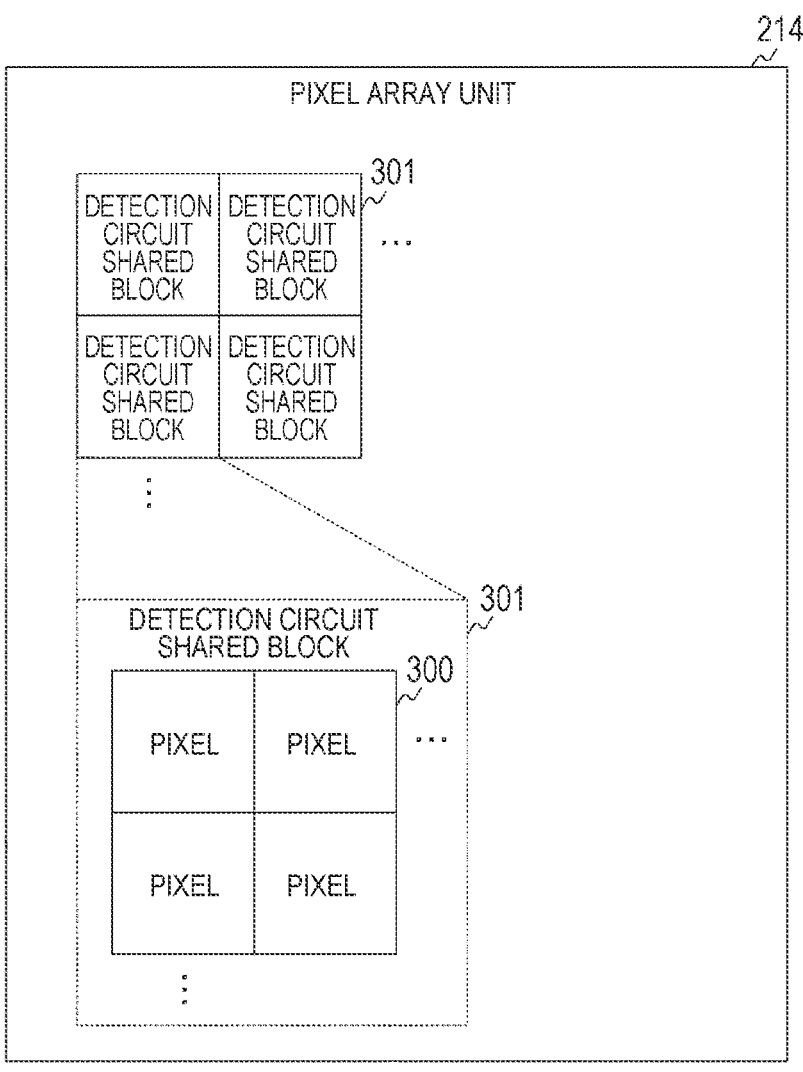
FIG. 12 is a plan view illustrating a configuration example of a pixel array unit according to a second embodiment of the present technology.

FIG. 12 is a plan view illustrating a configuration example of a pixel array unit 214 according to the second embodiment of the present technology. In the pixel array unit 214 of the second embodiment, a plurality of detection circuit shared blocks 301 is arrayed in a two-dimensional lattice manner. In each of the detection circuit shared blocks 301, a plurality of pixels 300 sharing one address event detection unit 400 is arrayed.

Figure 13:
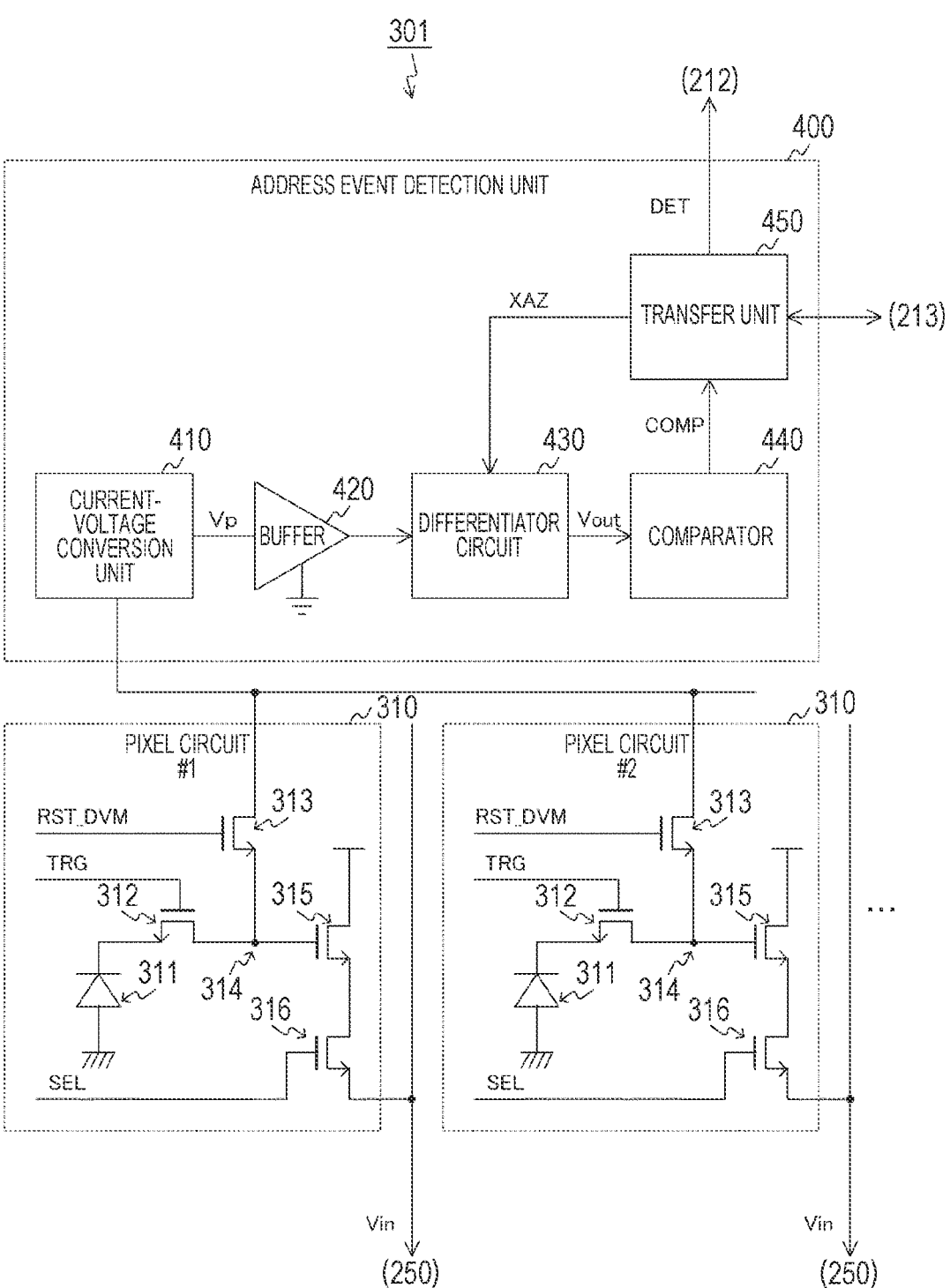
FIG. 13 is a block diagram illustrating a configuration example of a detection circuit shared block according to the second embodiment of the present technology.

FIG. 13 is a block diagram illustrating a configuration example of the detection circuit shared block 301 according to the second embodiment of the present technology. The detection circuit shared block 301 is provided with one address event detection unit 400 and a plurality of pixel circuits 310. The number of pixel circuits 310 is the same as the number of pixels in the detection circuit shared block 301.

Drains of connection transistors 313 of the pixel circuits 310 are commonly connected to the address event detection unit 400. Furthermore, in FIG. 13, a set of the pixel circuit 310 and the address event detection unit 400 constitutes one pixel 300. With the above connection configuration, the plurality of pixels 300 in the detection circuit shared block 301 shares one address event detection unit 400.

A drive circuit 211 selects one of the plurality of pixels 300 in the detection circuit shared block 301 in a detection mode, and supplies a control signal RST_DVM to the pixel 300. The pixel 300 to be selected is switched at regular intervals, for example.

As described above, according to the second embodiment of the present technology, since a plurality of pixels shares one address event detection unit 400, the circuit scale of the pixel array unit 214 can be reduced as compared with a case where the address event detection unit 400 is arranged for each pixel.

3. Third Embodiment

In the above-described first embodiment, the connection transistor 313 and the floating diffusion layer 314 have been arranged for each pixel. However, the circuit scale of the pixel array unit 214 increases as the number of pixels increases. A solid-state image sensor 200 according to a second embodiment is different from that of the first embodiment in that a plurality of pixels shares one floating diffusion layer 314.

Figure 14:
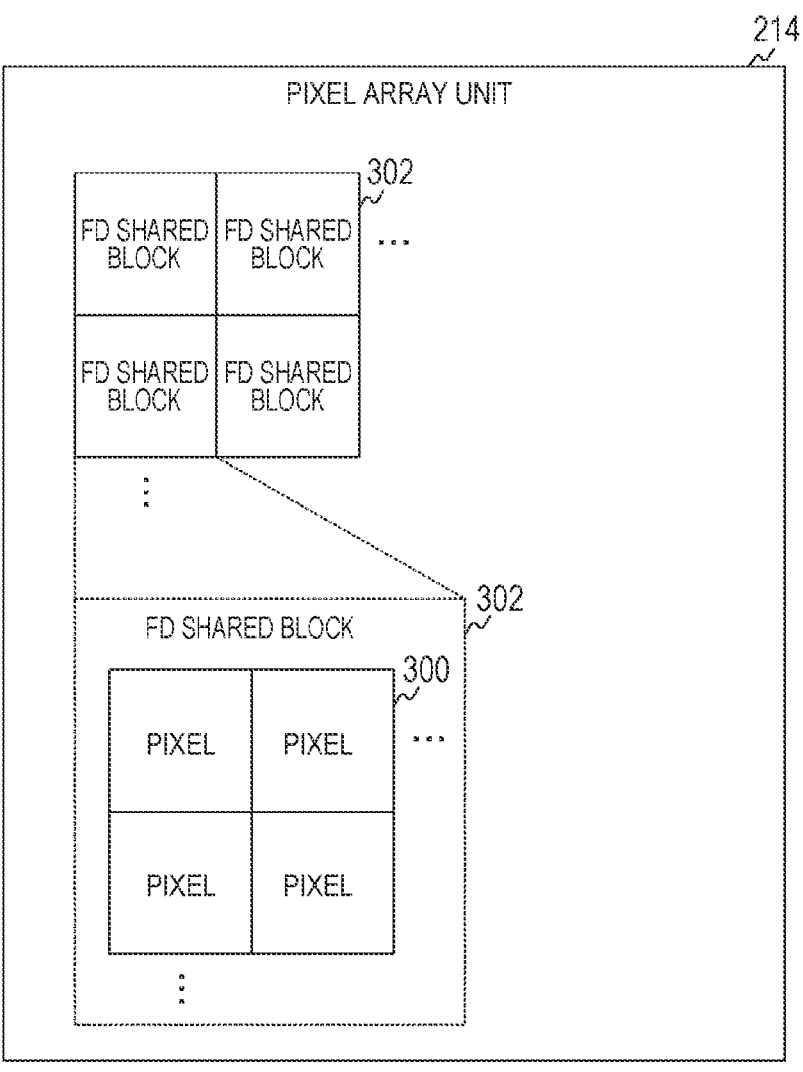
FIG. 14 is a plan view illustrating a configuration example of a pixel array unit according to a third embodiment of the present technology.

FIG. 14 is a plan view illustrating a configuration example of a pixel array unit 214 according to the third embodiment of the present technology. In the pixel array unit 214 of the third embodiment, a plurality of FD shared blocks 302 is arrayed in a two-dimensional lattice manner. In each of the FD shared blocks 302, a plurality of pixels 300 sharing one floating diffusion layer 314 is arrayed.

Figure 15:
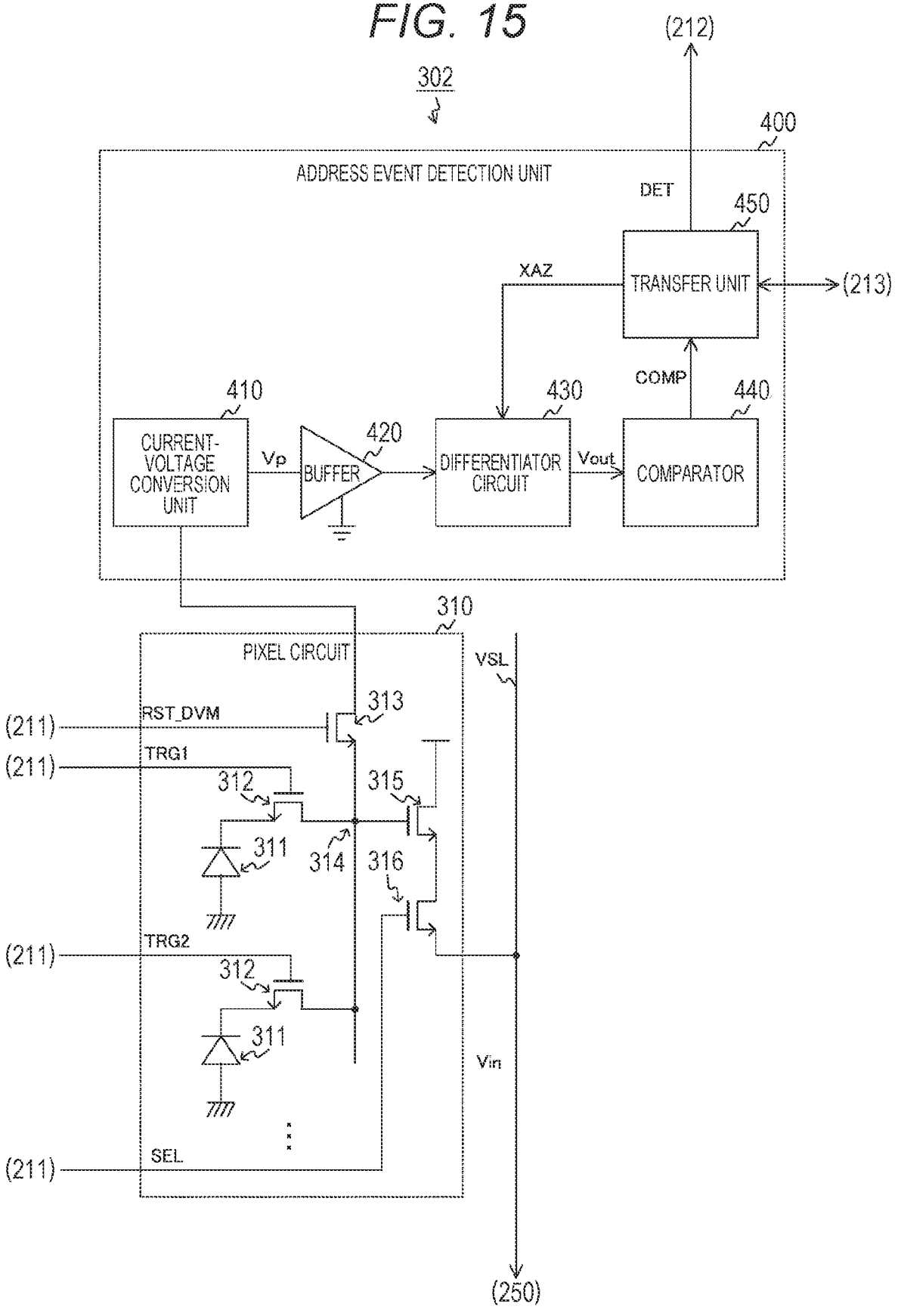
FIG. 15 is a block diagram illustrating a configuration example of an FD shared block according to the third embodiment of the present technology.

FIG. 15 is a block diagram illustrating a configuration example of the FD shared block 302 according to the third embodiment of the present technology. An address event detection unit 400 and a pixel circuit 310 are arranged in the FD shared block 302. In the pixel circuit 310, a plurality of photoelectric conversion elements 311, a plurality of transfer transistors 312, a connection transistor 313, a floating diffusion layer 314, an amplification transistor 315, and a selection transistor 316 are arranged.

The numbers of the photoelectric conversion elements 311 and the transfer transistors 312 are the same as the number of pixels in the FD shared block 302. Furthermore, the connection configuration of the connection transistor 313, the floating diffusion layer 314, the amplification transistor 315, and the selection transistor 316 is similar to that of the first embodiment.

The n-th (n is an integer) transfer transistor 312 transfers a charge from the n-th photoelectric conversion element 311 to the floating diffusion layer 314 according to a transfer signal TRGn. Furthermore, in FIG. 15, a set of the photoelectric conversion element 311 and the transfer transistor 312, and a rear-stage circuit constitute one pixel 300.

With the above connection configuration, the floating diffusion layer 314 and the rear-stage circuit (address event detection unit 400, and the like) are shared by the plurality of pixels 300.

A drive circuit 211 selects one of the plurality of pixels 300 in the FD shared block 302 in each of an imaging mode and a detection mode, and supplies a control signal RST_DVM to the pixel 300. The pixel 300 to be selected is switched at regular intervals, for example.

Note that the second embodiment can also be applied to the solid-state image sensor 200 of the third embodiment. In this case, each of the pixel circuits 310 illustrated in FIG. 12 is only required to be replaced with the circuits illustrated in FIG. 14.

As described above, according to the third embodiment of the present technology, since the plurality of pixels shares the floating diffusion layer 314 and the rear-stage circuit, the circuit scale of the pixel array unit 214 can be reduced as compared with a case where the floating diffusion layer 314 and the like are provided for each pixel.

4. Fourth Embodiment

In the above-described first embodiment, the floating diffusion layer 314 has been initialized with the connection transistor 313 in the close state. With the configuration, the power supply voltage connected to the floating diffusion layer 314 at the initialization is the same as that of the address event detection unit 400. Therefore, the power supply voltage to be used for initialization cannot be adjusted to a value different from the power supply voltage of the address event detection unit 400, and reset level adjustment may be difficult. A solid-state image sensor 200 according to a fourth embodiment is different from that of the first embodiment in that a reset transistor for initializing a floating diffusion layer 314 is added separately from a connection transistor 313.

Figure 16:
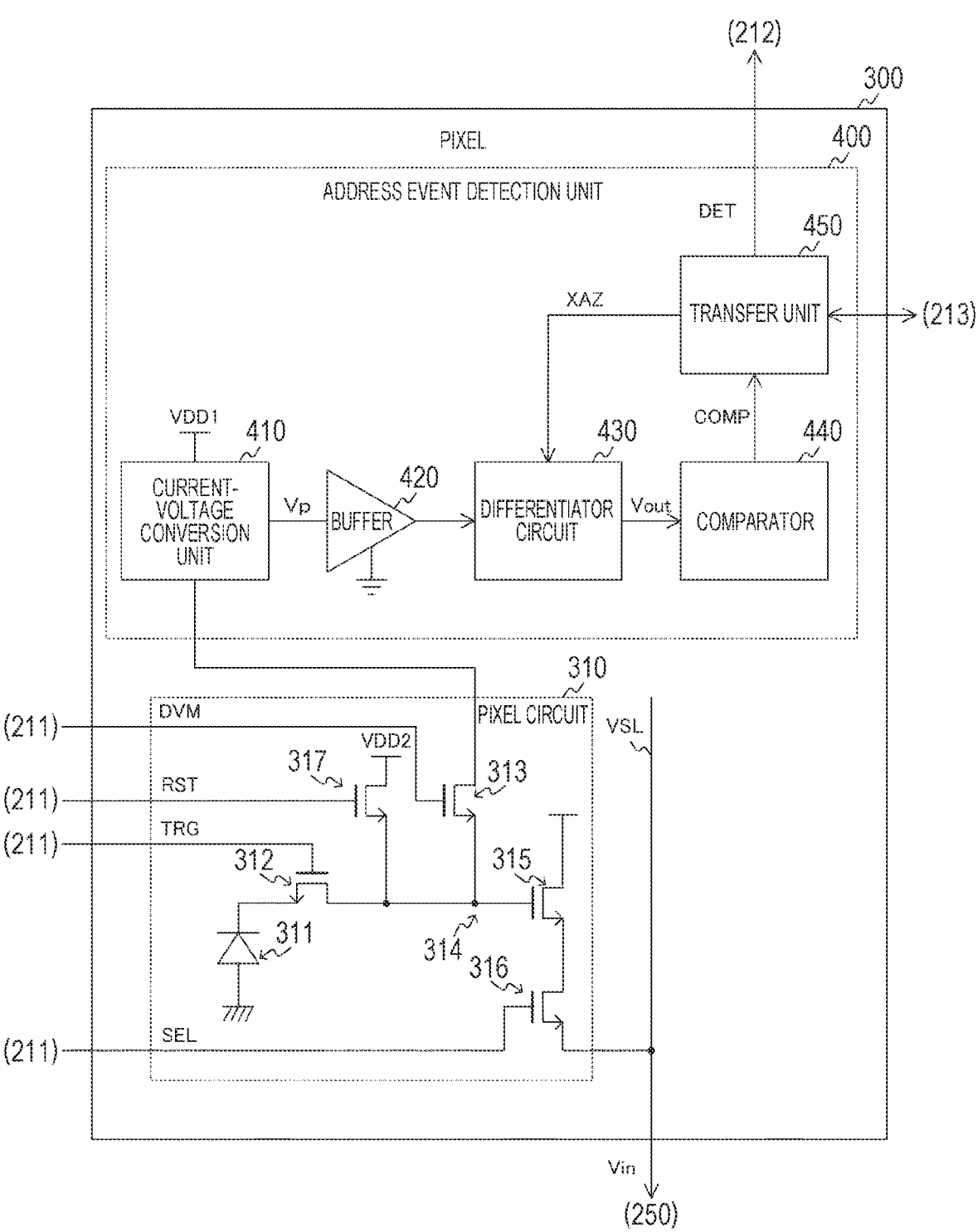
FIG. 16 is a block diagram illustrating a configuration example of a pixel according to a fourth embodiment of the present technology.

FIG. 16 is a block diagram illustrating a configuration example of a pixel 300 according to the fourth embodiment of the present technology. The pixel 300 of the fourth embodiment is different from that of the first embodiment in that a reset transistor 317 is further provided in a pixel circuit 310. An N-type MOS transistor is used as the reset transistor 317, for example.

The reset transistor 317 connects the floating diffusion layer 314 to a power supply voltage VDD2 according to a reset signal RST from a drive circuit 211, and initializes the floating diffusion layer 314. Furthermore, a power supply voltage of an address event detection unit 400 is set to VDD1. The drive circuit 211 supplies a control signal DVM to the connection transistor 313.

The power supply voltage VDD2 used for initialization may be the same as or different from the power supply voltage VDD1 of the address event detection unit 400. By adding the reset transistor 317, the power supply voltage VDD2 used for initialization can be adjusted to a value different from the power supply voltage VDD1 of the address event detection unit 400. Thereby, the reset level adjustment becomes easy.

Figure 17:
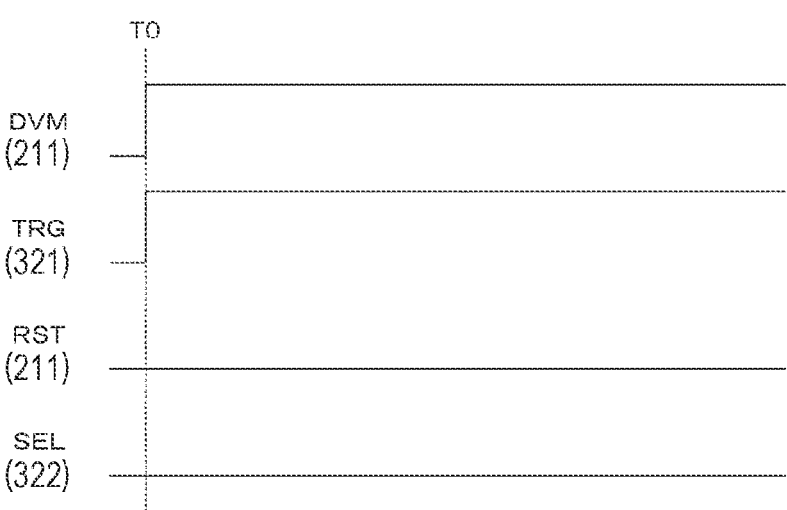
FIG. 17 is a timing chart illustrating an example of an operation of a solid-state image sensor in a detection mode according to the fourth embodiment of the present technology.

FIG. 17 is a timing chart illustrating an example of an operation of the solid-state image sensor 200 in a detection mode according to the fourth embodiment of the present technology. For example, when the detection mode is set at timing TO, the drive circuit 211 sets the control signal DVM and a transfer signal TRG to high level. Meanwhile, in the detection mode, the reset signal RST and a selection signal SEL are controlled to, for example, low level.

Figure 18:
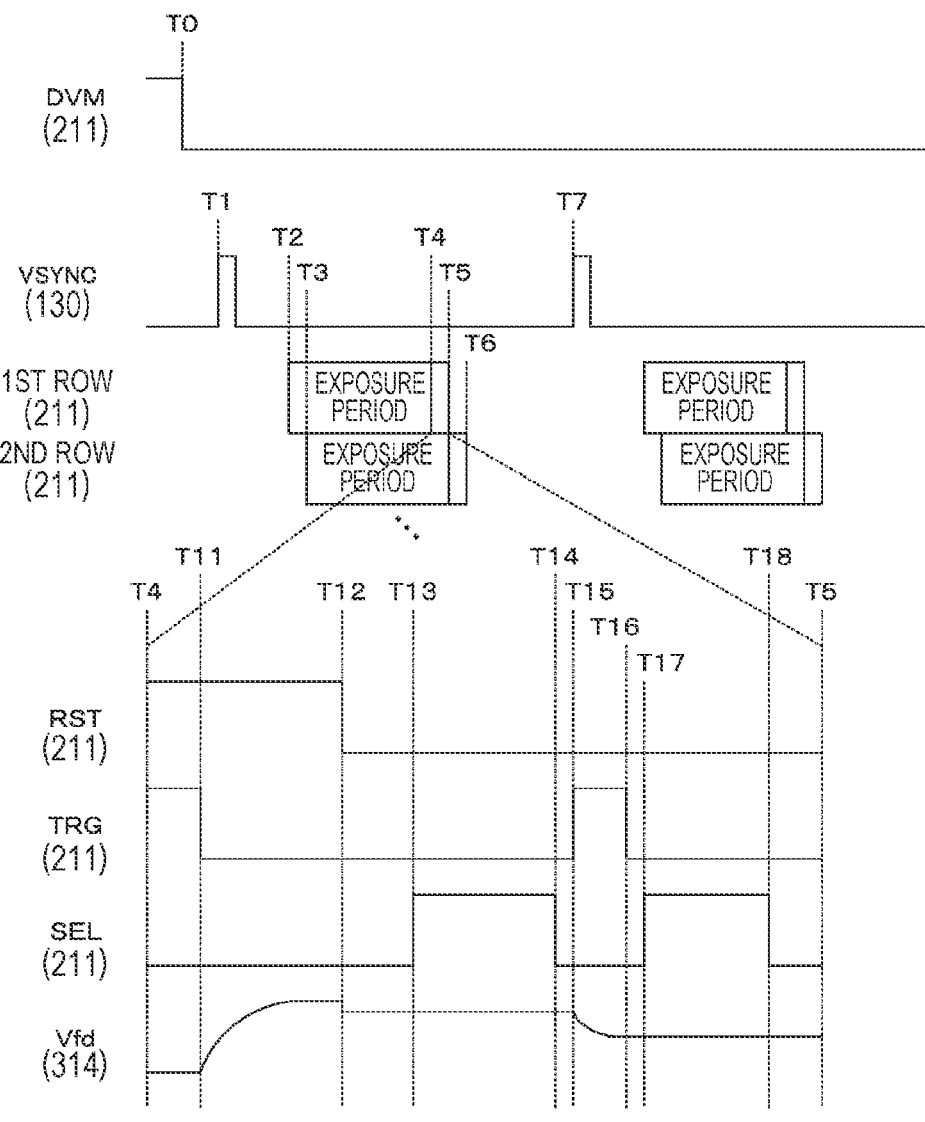
FIG. 18 is a timing chart illustrating an example of an operation of the solid-state image sensor in an imaging mode according to the fourth embodiment of the present technology.

FIG. 18 is a timing chart illustrating an example of an operation of the solid-state image sensor 200 in an imaging mode according to the fourth embodiment of the present technology. For example, when the imaging mode is set at timing TO, the drive circuit 211 sets the control signal DVM to the low level.

The drive circuit 211 supplies the high-level reset signal RST over a reset period from timing T11 to T12 to initialize the floating diffusion layer 314. Subsequent control is similar to the control of the first embodiment.

Note that the second or third embodiment can also be applied to the solid-state image sensor 200 of the fourth embodiment.

As described above, according to the fourth embodiment of the present technology, since the reset transistor 317 for initializing the floating diffusion layer 314 is added, the power supply voltage used for initialization can be adjusted to a value different from the power supply voltage of the address event detection unit 400. Thereby, the reset level adjustment becomes easy.

5. Fifth Embodiment

In the above-described first embodiment, the pixel 300 has generated the pixel signal with the constant charge-voltage conversion efficiency. It is desirable to switch the conversion efficiency and generate the pixel signal from the viewpoint of reducing noise at low illuminance. A solid-state image sensor 200 according to a fifth embodiment is different from that of the first embodiment in that a conversion efficiency control transistor for controlling charge-voltage conversion efficiency is added.

Figure 19:
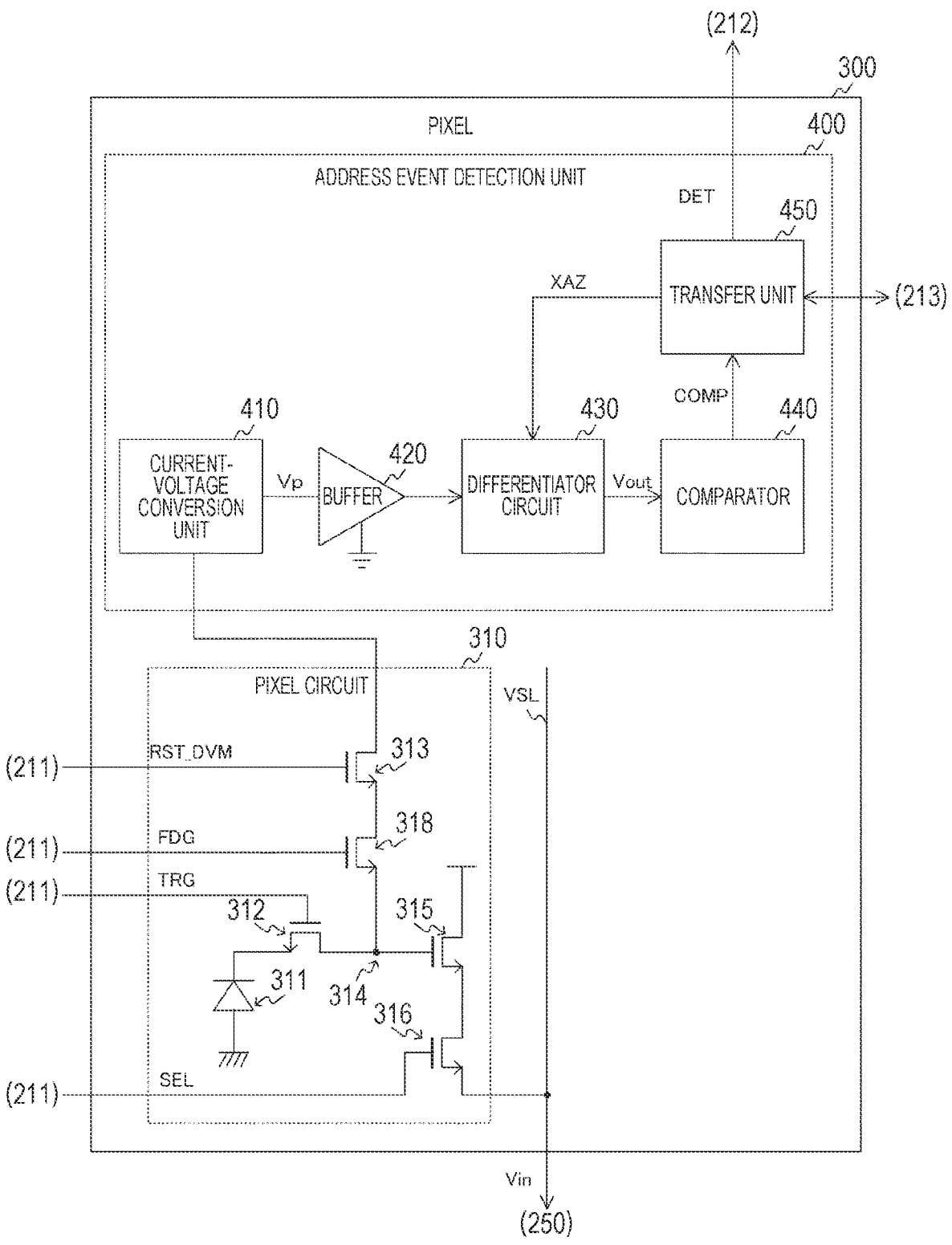
FIG. 19 is a block diagram illustrating a configuration example of a pixel according to a fifth embodiment of the present technology.

FIG. 19 is a block diagram illustrating a configuration example of a pixel 300 according to the fifth embodiment of the present technology. The pixel 300 of the fifth embodiment is different from that of the first embodiment in that a conversion efficiency control transistor 318 is further provided in a pixel circuit 310. An N-type MOS transistor is used as the conversion efficiency control transistor 318, for example. Further, the conversion efficiency control transistor 318 is inserted between a connection transistor 313 and a floating diffusion layer 314.

The conversion efficiency control transistor 318 controls the charge-voltage conversion efficiency according to a control signal FDG from a drive circuit 211.

Furthermore, in the fifth embodiment, an imaging mode includes a high-efficiency imaging mode in which higher one of two different charge-voltage conversion efficiencies is set, and a low-efficiency imaging mode in which the lower one is set. In capturing image data, for example, pixel signal generation in one of the high-efficiency imaging mode and the low-efficiency imaging mode and pixel signal generation in the other mode are performed in order.

Figure 20:
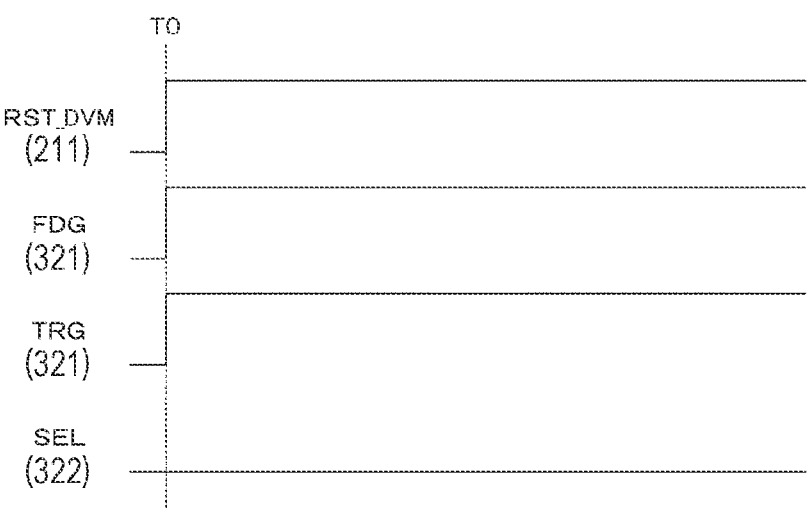
FIG. 20 is a timing chart illustrating an example of an operation of a solid-state image sensor in a detection mode according to the fifth embodiment of the present technology.

FIG. 20 is a timing chart illustrating an example of an operation of the solid-state image sensor 200 in a detection mode according to the fifth embodiment of the present technology. For example, when the detection mode is set at timing TO, the drive circuit 211 sets a control signal RST_DVM, a control signal FDG, and a transfer signal TRG to high level. Meanwhile, in the detection mode, the selection signal SEL is controlled to, for example, the low level.

Figure 21:
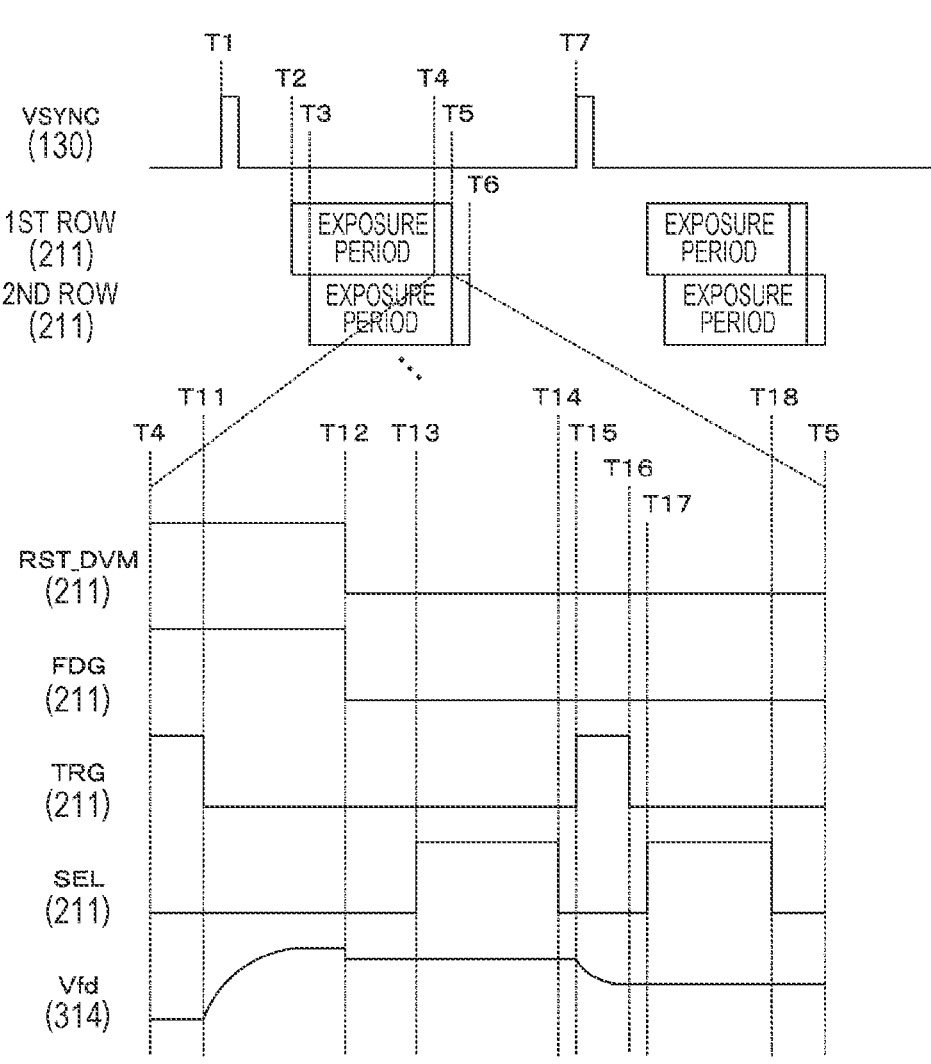
FIG. 21 is a timing chart illustrating an example of an operation of the solid-state image sensor in a high-efficiency imaging mode according to the fifth embodiment of the present technology.

FIG. 21 is a timing chart illustrating an example of an operation of the solid-state image sensor 200 in the high-efficiency imaging mode according to the fifth embodiment of the present technology.

In a readout period such as timing T4 to T5, the drive circuit 211 supplies the high-level reset signal RST and the high-level control signal FDG over a reset period from timing T11 to T12 to initialize the floating diffusion layer 314. As a result, a reset level is generated. Then, the drive circuit 211 sets a selection signal SEL to the high level in a conversion period from timing T13 to T14, and a column signal processing unit 250 performs AD conversion for the reset level.

Next, the drive circuit 211 supplies the high-level transfer signal TRG to transfer a charge to the floating diffusion layer 314 while setting the control signal FDG to the low level over a transfer period from timing T15 to T16. As a result, the signal level is generated with the higher conversion efficiency. Then, the drive circuit 211 sets the selection signal SEL to the high level and the column signal processing unit 250 performs AD conversion for the signal level in the conversion period from timing T17 to T18.

Figure 22:
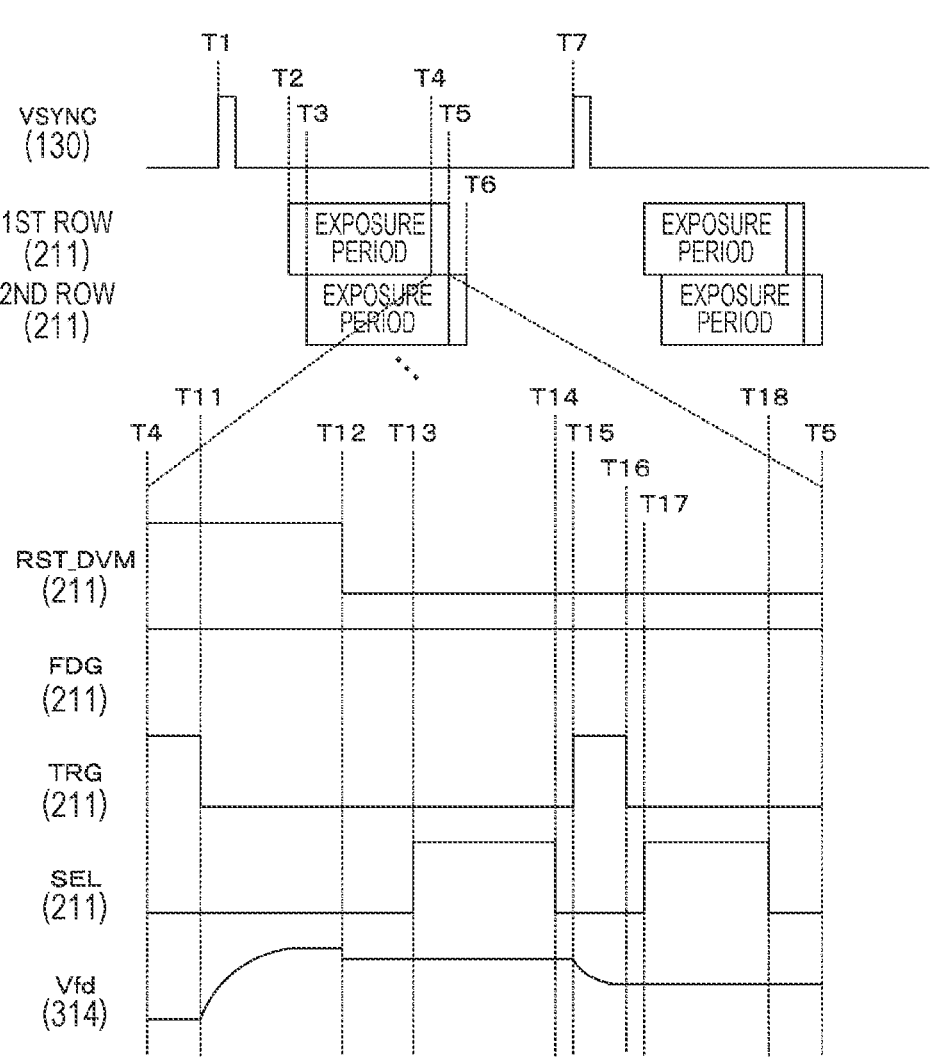
FIG. 22 is a timing chart illustrating an example of an operation of the solid-state image sensor in a low-efficiency imaging mode according to the fifth embodiment of the present technology.

FIG. 22 is a timing chart illustrating an example of an operation of the solid-state image sensor 200 in the low-efficiency imaging mode according to the fifth embodiment of the present technology.

The drive circuit 211 supplies the high-level reset signal RST and the high-level control signal FDG over the reset period from timing T11 to T12 to initialize the floating diffusion layer 314. As a result, a reset level is generated. Furthermore, the drive signal FDG is maintained at the high level even after timing T12. Then, the drive circuit 211 sets a selection signal SEL to the high level in a conversion period from timing T13 to T14, and a column signal processing unit 250 performs AD conversion for the reset level.

Next, the drive circuit 211 supplies the high-level transfer signal TRG to transfer the charge to the floating diffusion layer 314 while setting the control signal FDG to the high level over the transfer period from timing T15 to T16. As a result, the signal level is generated with the lower conversion efficiency. Then, the drive circuit 211 sets the selection signal SEL to the high level and the column signal processing unit 250 performs AD conversion for the signal level in the conversion period from timing T17 to T18.

In the imaging mode, the column signal processing unit 250 generates a digital signal Dout by AD conversion processing and CDS processing. Then, in a case where the digital signal Dout with the high conversion efficiency is less than a full scale for each pixel, the column signal processing unit 250 corrects the signal as necessary and outputs the signal as a signal of the pixel. On the other hand, in a case where the digital signal Dout with the high conversion efficiency is the full scale, the column signal processing unit 250 corrects the digital signal Dout with the low conversion efficiency as necessary and outputs the signal as the signal of the pixel. Thereby, the dynamic range can be expanded and the noise of the low-illuminance signal can be reduced.

Figure 23:
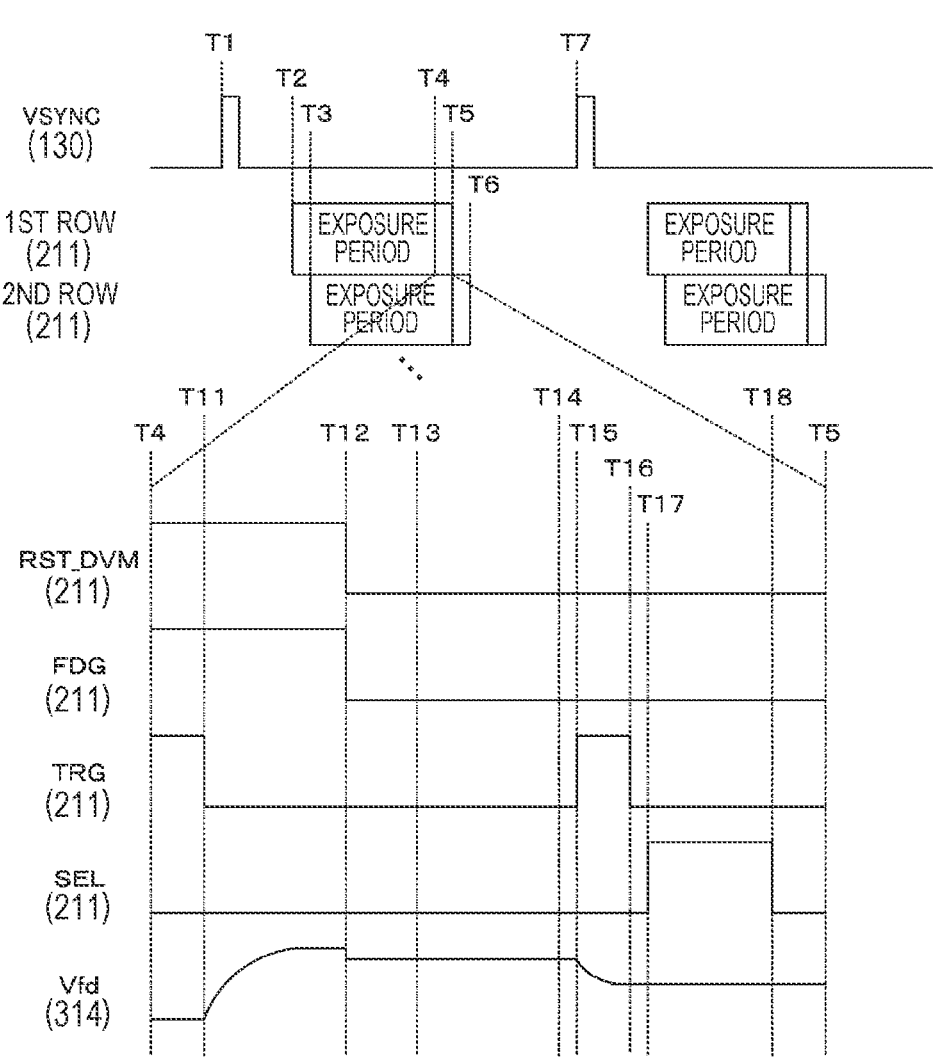
FIG. 23 is a timing chart illustrating an example of an operation of the solid-state image sensor in the high-efficiency imaging mode in a case of not performing CDS processing according to the fifth embodiment of the present technology.
Figure 24:
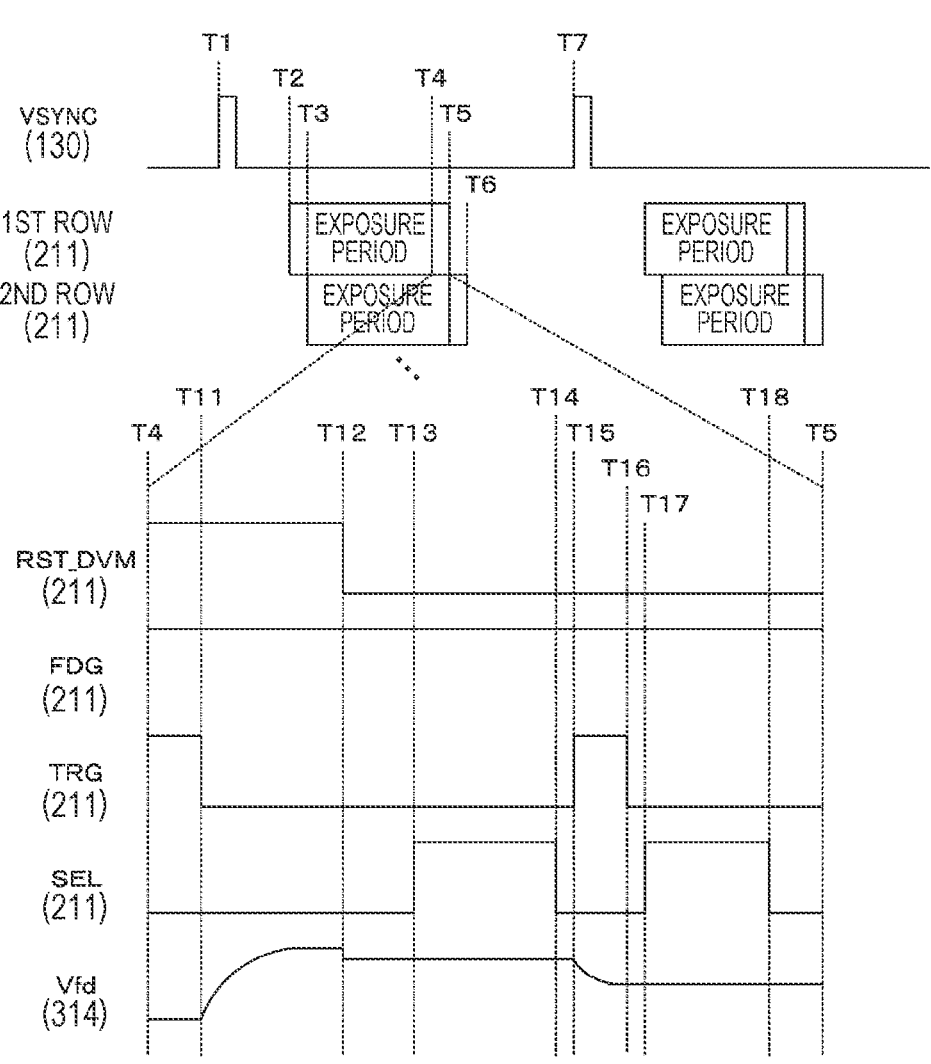
FIG. 24 is a timing chart illustrating an example of an operation of the solid-state image sensor in the low-efficiency imaging mode in the case of not performing CDS processing according to the fifth embodiment of the present technology.

Note that the column signal processing unit 250 performs the CDS processing but can be configured no to perform the CDS processing. In this case, as illustrated in FIGS. 23 and 24, the selection signal SEL is set to the low level and the reset level is not converted until timing T14.

Note that the second or third embodiment can also be applied to the solid-state image sensor 200 of the fifth embodiment.

As described above, according to the fifth embodiment of the present technology, since the conversion efficiency control transistor 318 for controlling the charge-voltage conversion efficiency is added, the pixel signal is generated while switching the conversion efficiency, and the noise at low illuminance can be reduced.

6. Sixth Embodiment

In the above-described fifth embodiment, the floating diffusion layer 314 has been initialized with the connection transistor 313 and the conversion efficiency control transistor 318 in the close state. However, with the configuration, the power supply voltage connected to the floating diffusion layer 314 at the initialization is the same as that of the address event detection unit 400. Therefore, the power supply voltage to be used for initialization cannot be adjusted to a value different from the power supply voltage of the address event detection unit 400, and reset level adjustment may be difficult. A solid-state image sensor 200 according to a sixth embodiment is different from that of the fifth embodiment in that the fourth embodiment is further applied.

Figure 25:
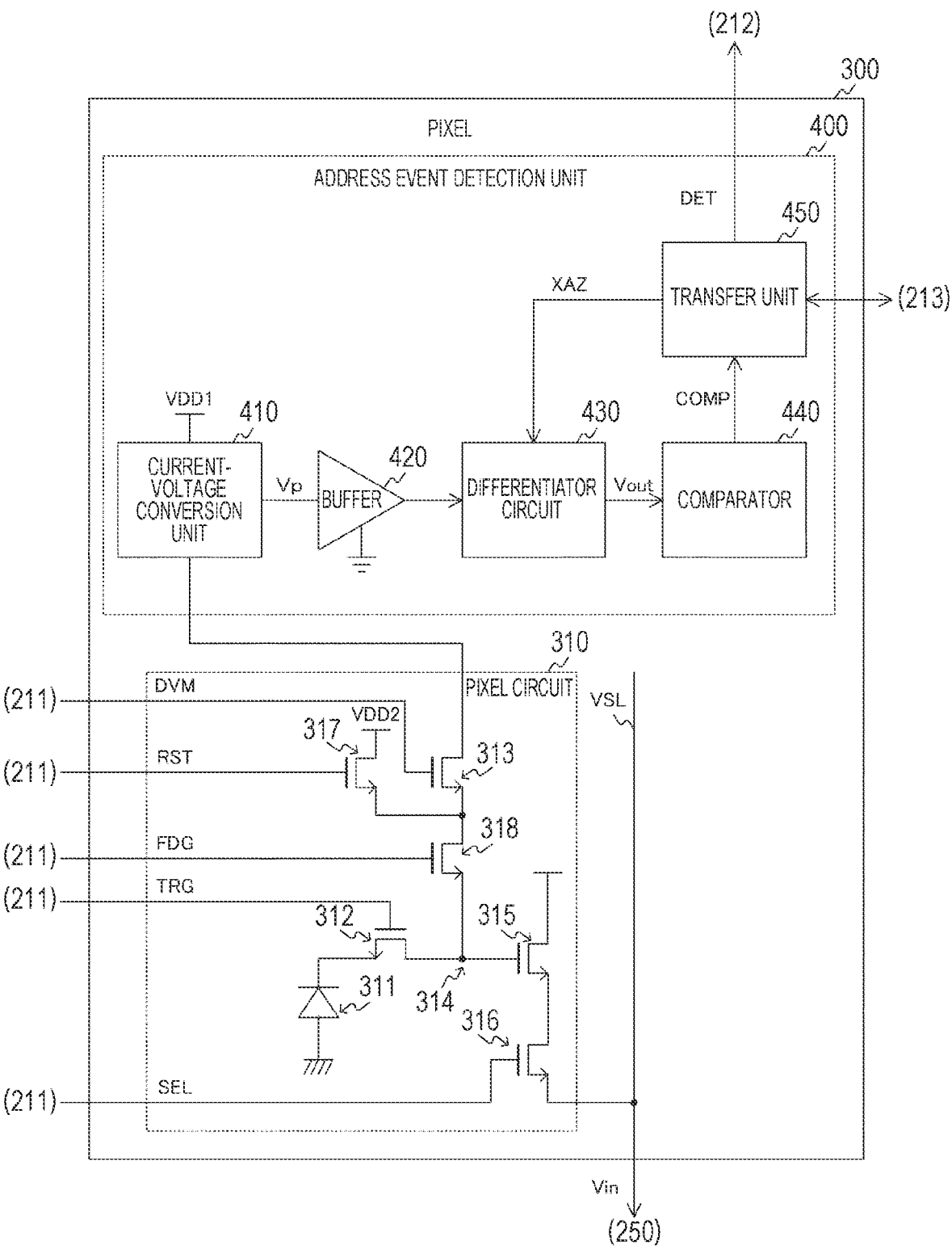
FIG. 25 is a block diagram illustrating a configuration example of a pixel according to a sixth embodiment of the present technology.

FIG. 25 is a block diagram illustrating a configuration example of a pixel 300 according to the sixth embodiment of the present technology. The pixel 300 of the sixth embodiment is different from that of the fifth embodiment in that a reset transistor 317 is further provided in a pixel circuit 310.

The reset transistor 317 initializes a floating diffusion layer 314 according to a reset signal RST from a drive circuit 211. The reset transistor 317 is inserted between a terminal of a power supply voltage VSDD2 and a connection point of a connection transistor 313 and a conversion efficiency control transistor 318. Furthermore, a power supply voltage of an address event detection unit 400 is set to VDD1. The drive circuit 211 supplies a control signal DVM to the connection transistor 313.

The power supply voltage VDD2 used for initialization may be the same as or different from the power supply voltage VDD1 of the address event detection unit 400. By adding the reset transistor 317, the power supply voltage VDD2 used for initialization can be adjusted to a value different from the power supply voltage VDD1 of the address event detection unit 400.

Figure 26:
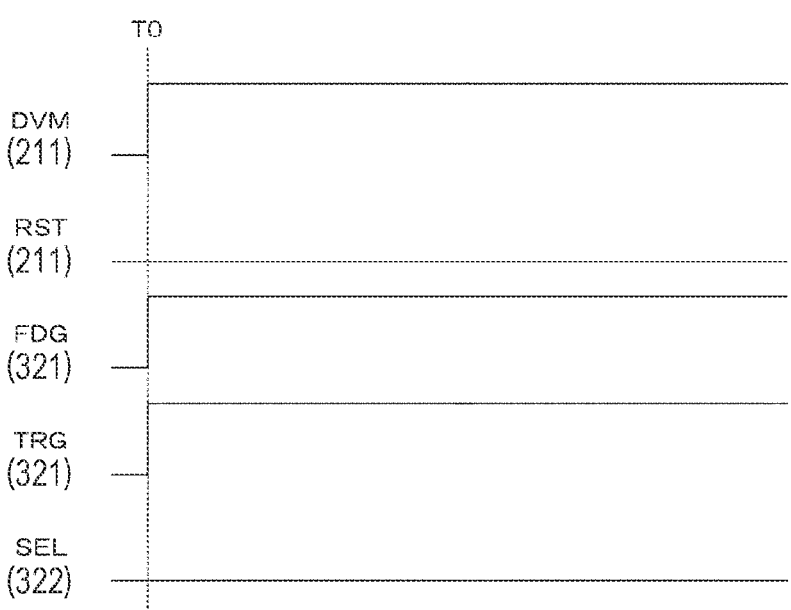
FIG. 26 is a timing chart illustrating an example of an operation of a solid-state image sensor in a detection mode according to the sixth embodiment of the present technology.

FIG. 26 is a timing chart illustrating an example of an operation of the solid-state image sensor 200 in a detection mode according to the sixth embodiment of the present technology. For example, when a detection mode is set at timing TO, the drive circuit 211 sets a control signal DVM, a control signal FDG, and a transfer signal TRG to high level. Meanwhile, in the detection mode, the reset signal RST and a selection signal SEL are controlled to, for example, low level.

Figure 27:
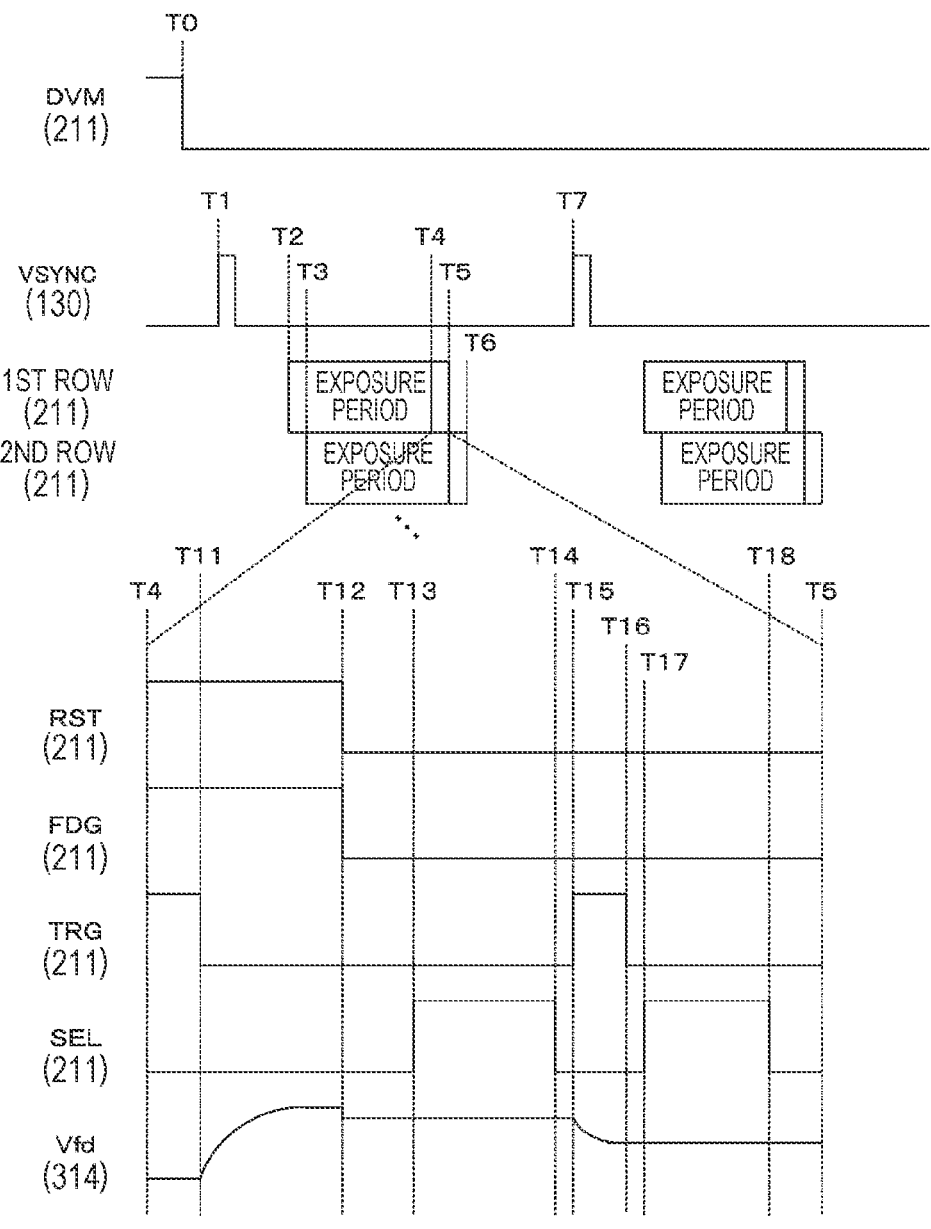
FIG. 27 is a timing chart illustrating an example of an operation of the solid-state image sensor in a high-efficiency imaging mode according to the sixth embodiment of the present technology.

FIG. 27 is a timing chart illustrating an example of an operation of the solid-state image sensor 200 in a high-efficiency imaging mode according to the sixth embodiment of the present technology. For example, when the imaging mode is set at timing TO, the drive circuit 211 sets the control signal DVM to the low level.

The drive circuit 211 supplies a high-level reset signal RST and a high-level control signal FDG over a reset period from predetermined timing T11 to T12 to initialize the floating diffusion layer 314. Subsequent control is similar to the control of the fifth embodiment.

Figure 28:
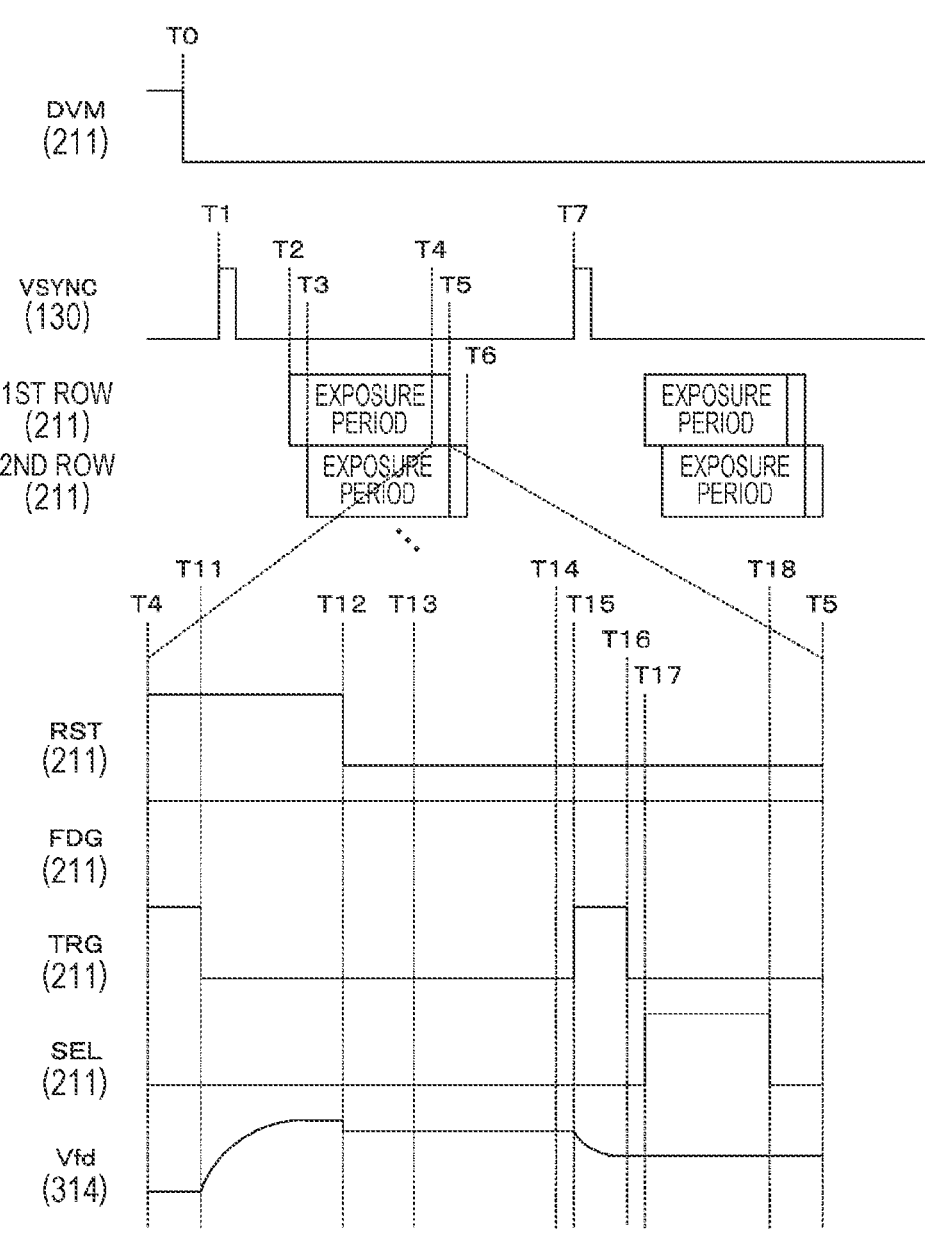
FIG. 28 is a timing chart illustrating an example of an operation of the solid-state image sensor in a low-efficiency imaging mode according to the sixth embodiment of the present technology.

FIG. 28 is a timing chart illustrating an example of an operation of the solid-state image sensor 200 in the low-efficiency imaging mode according to the sixth embodiment of the present technology. A control signal DVM is set to the low level.

As described above, according to the sixth embodiment of the present technology, since the reset transistor 317 for initializing the floating diffusion layer 314 is added, the power supply voltage used for initialization can be adjusted to a value different from the power supply voltage of the address event detection unit 400. Thereby, the reset level adjustment becomes easy.

7. Seventh Embodiment

In the above-described first embodiment, the voltage of the floating diffusion layer 314 has been amplified with a fixed gain by the amplification transistor 315. However, the gain may be insufficient only by the amplification transistor 315. A solid-state image sensor 200 according to a seventh embodiment is different from that of the first embodiment in that a difference between pixel signals of a pair of pixels is amplified and read out.

Figure 29:
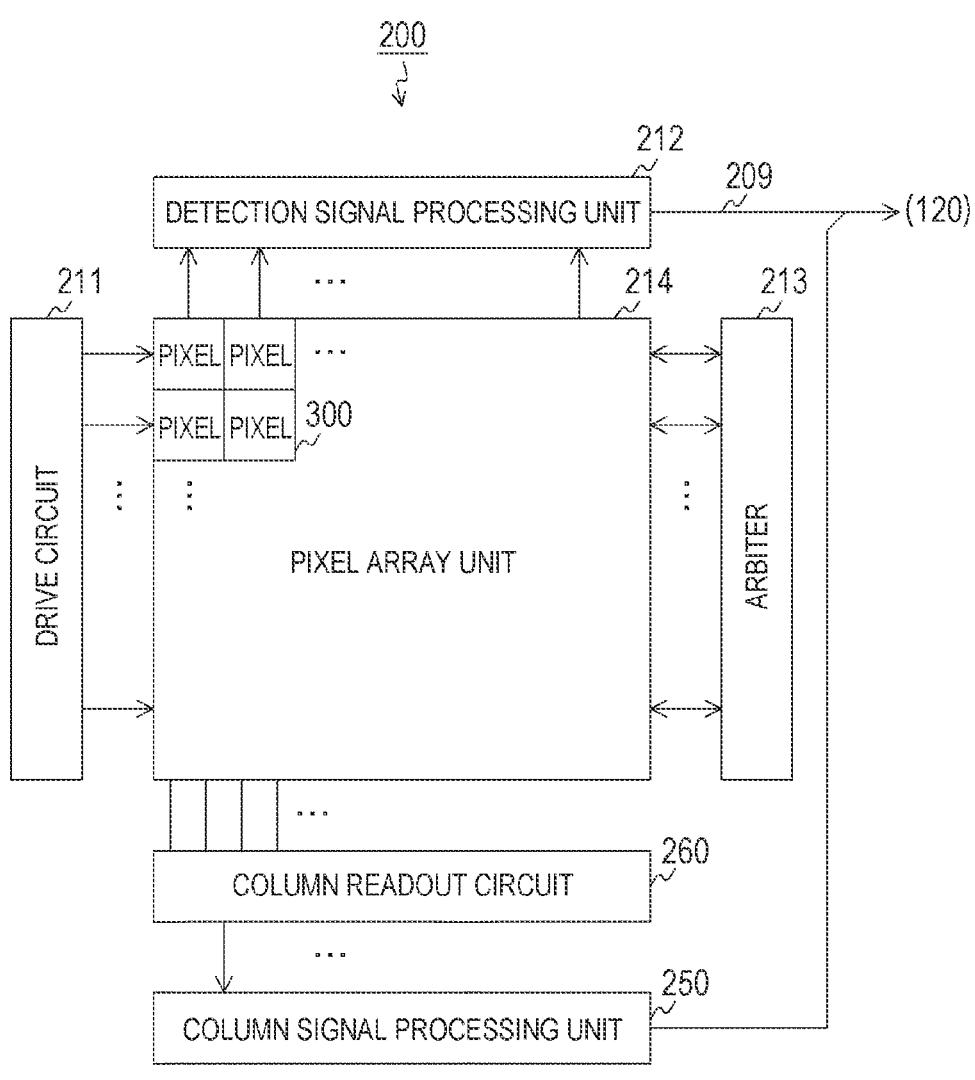
FIG. 29 is a block diagram illustrating a configuration example of a solid-state image sensor according to a seventh embodiment of the present technology.

FIG. 29 is a block diagram illustrating a configuration example of the solid-state image sensor 200 according to the seventh embodiment of the present technology. The solid-state image sensor 200 according to the seventh embodiment is different from that of the first embodiment in further including a column readout circuit 260.

The column readout circuit 260 amplifies and reads a difference between pixel signals of a pair of adjacent pixels. The column readout circuit 260 supplies the amplified signal to a column signal processing unit 250. Note that the column readout circuit 260 is an example of a readout circuit described in claims.

Figure 30:
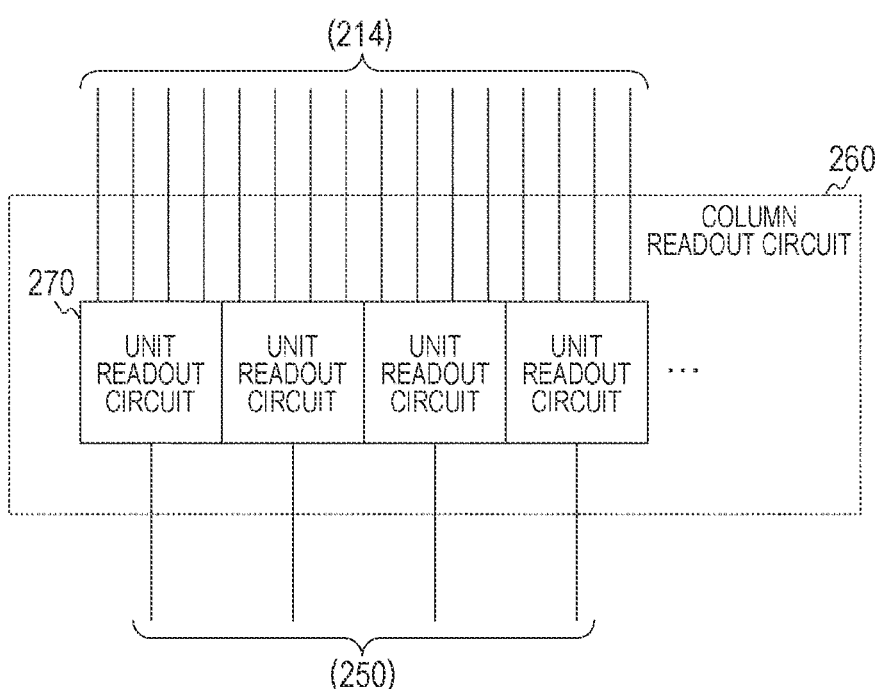
FIG. 30 is a block diagram illustrating a configuration example of a column readout circuit according to the seventh embodiment of the present technology.

FIG. 30 is a block diagram illustrating a configuration example of the column readout circuit 260 according to the seventh embodiment of the present technology. In the column readout circuit 260, a plurality of unit readout circuits 270 is arrayed along a horizontal direction. The unit readout circuit 270 is arranged for every two columns. Assuming that the number of columns of a pixel array unit 214 is Y, the number of the unit readout circuits 270 is Y/2.

The unit readout circuit 270 amplifies the difference between the pixel signals of the corresponding two columns and supplies the amplified difference to the column signal processing unit 250.

Furthermore, in the column signal processing unit 250 of the seventh embodiment, an AD converter 251 is arranged for each unit readout circuit 270, not for each column.

Figure 31:
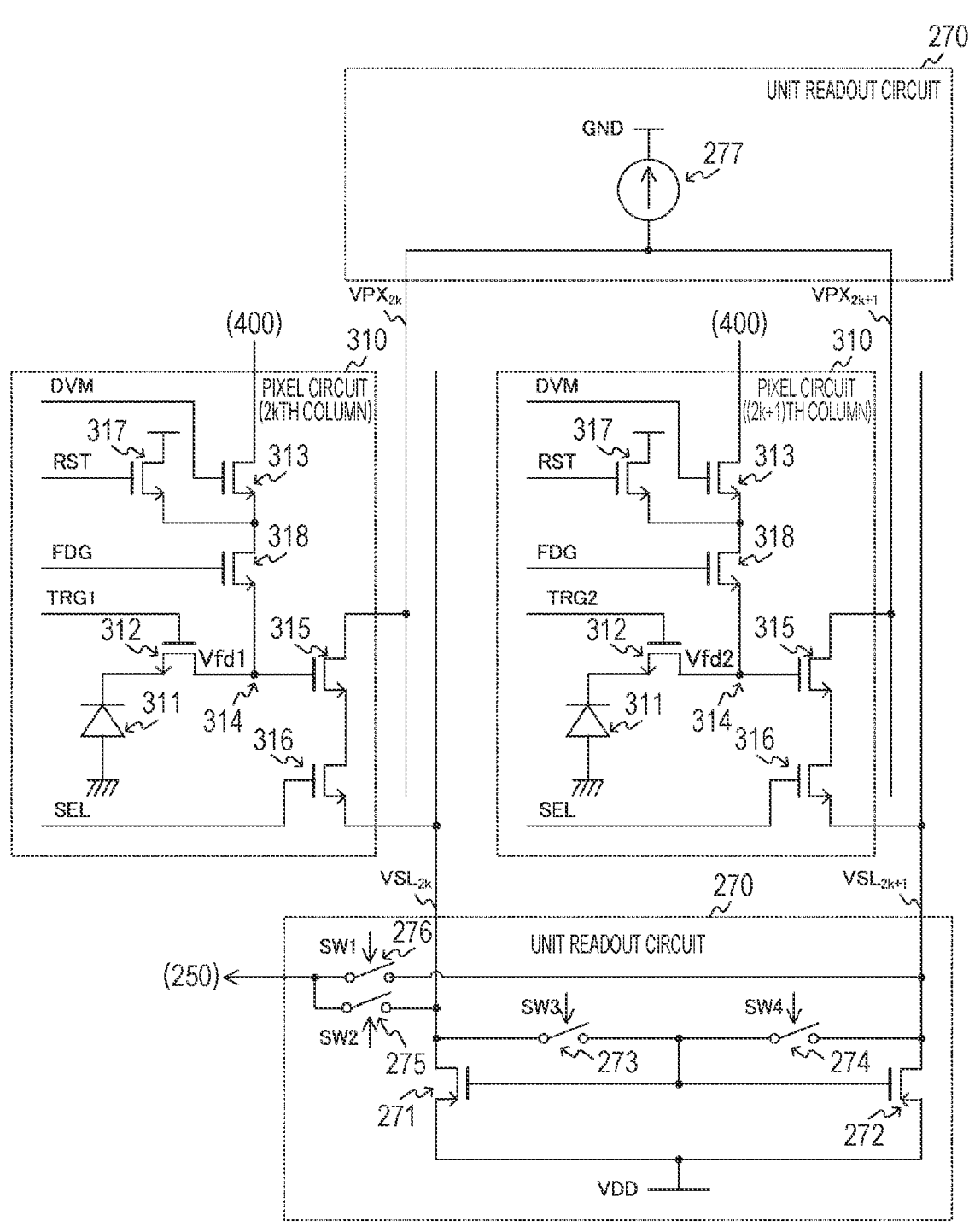
FIG. 31 is a circuit diagram illustrating a configuration example of a unit readout circuit according to the seventh embodiment of the present technology.

FIG. 31 is a circuit diagram illustrating a configuration example of the unit readout circuit 270 according to the seventh embodiment of the present technology. The unit readout circuit 270 includes P-type transistors 271 and 272, switches 273 to 276, and a current source 277. A MOS transistor is used as the P-type transistors 271 and 272, for example.

Furthermore, a vertical current line VPX is wired in addition to a vertical signal line VSL for each column along a column direction in the pixel array unit 214. The vertical signal line VSL and the vertical current line VPX in the 2k-th (k is an integer) column are vertical signal line $VSL_{2k}$ and vertical current line $VPX_{2k}$. Furthermore, the vertical signal line VSL and the vertical current line VPX in the (2k+1)th column are vertical signal line $VSL_{2k+1}$ and vertical current line $VPX_{2k+1}$.

A drain of an amplification transistor 315 in the 2k-th column is connected to the vertical current line $VPX_{2k}$, and a drain of an amplification transistor 315 in the (2k+1)th column is connected to the vertical current line $VPX_{2k+1}$.

The P-type transistors 271 and 272 are connected in parallel to a terminal of a power supply voltage VDD. Furthermore, gates of these transistors are connected to each other.

The switch 273 opens or closes a path between a gate and a drain of the P-type transistor 271 according to a control signal SW3 from a drive circuit 211. The switch 274 opens or closes a path between a gate and a drain of the P-type transistor 272 according to a control signal SW4 from the drive circuit 211.

The switch 275 opens or closes a path between the drain of the P-type transistor 271 and the column signal processing unit 250 according to a control signal SW2 from the drive circuit 211. The switch 276 opens or closes a path between the drain of the P-type transistor 272 and the column signal processing unit 250 according to a control signal SW1 from the drive circuit 211.

The current source 277 supplies a predetermined constant current. The current source 277 is commonly connected to the vertical current lines $VPX_{2k}$ and $VPX_{2k+1}$.

The drive circuit 211 uses one of the 2k-th column and the (2k+1)th column in a selected row as a reference pixel and the other as a signal pixel. First, for example, the drive circuit 211 uses the pixel in the 2k-th column as the signal pixel and the pixel in the (2k+1)th column as the reference pixel. Next, the drive circuit 211 uses the pixel in the 2k-th column as the reference pixel and the pixel in the (2k+1)th column as the signal pixel. Furthermore, it is assumed that a transfer signal TRG1 is supplied to the 2k-th column and a transfer signal TRG2 is supplied to the (2k+1)th column.

In the case of using the pixel in the 2k-th column as the signal pixel, the drive circuit 211 sets the switches 274 and 275 to be in a close state and the switches 273 and 276 to be in an open state, using the control signal. Thereby, the unit readout circuit 270 and the signal pixel and the reference pixel constitute a differential amplifier circuit. Meanwhile, in the case of using the pixel in the (2k+1)th column as the signal pixel, the drive circuit 211 sets the switches 274 and 275 to be in the open state and the switches 273 and 276 to be in the close state, using the control signal.

The unit readout circuit 270 amplifies the difference between the pixel signals of the reference pixel and the signal pixel, and supplies the amplified signal as the pixel signal of the signal pixel to the column signal processing unit 250.

Figure 32:
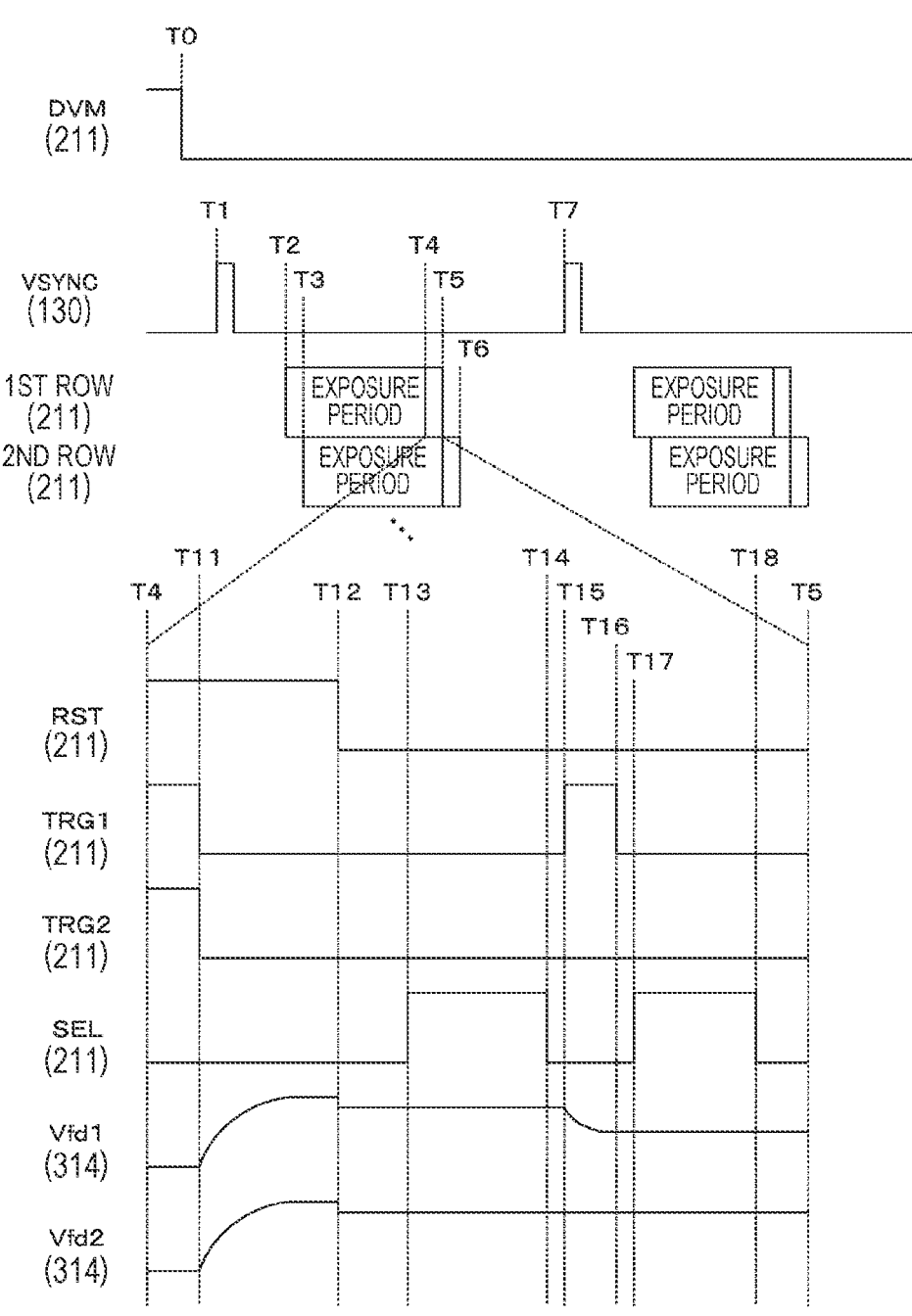
FIG. 32 is a timing chart illustrating an example of an operation of the solid-state image sensor in a detection mode according to the seventh embodiment of the present technology.

FIG. 32 is a timing chart illustrating an example of an operation of the solid-state image sensor in a detection mode according to the seventh embodiment of the present technology. The control of the seventh embodiment is similar to the control of the fourth embodiment illustrated in FIG. 18, except that transfer timings of the 2k-th column and the (2k+1)th column are different.

In the case of reading the 2k-th column first, the drive circuit 211 supplies a high-level transfer signal TRG1 to the 2k-th column in a transfer period from timing T15 to T16. Meanwhile, a transfer signal TRG2 to the (2k+1)th column remains at low level in this transfer period. A potential Vfd1 of a floating diffusion layer 314 in the 2k-th column changes from a reset level to a signal level by transfer, while a potential Vfd2 of the floating diffusion layer 314 in the 2k-th column remains at the reset level. Then, after reading the 2k-th column, the (2k+1)th column is read by the transfer signal TRG2.

Note that each of the second to sixth embodiments can be applied to the solid-state image sensor 200 of the seventh embodiment.

As described above, according to the seventh embodiment of the present technology, since the column readout circuit 260 amplifies the difference between the pixel signals of a pair of pixels, the gain can be made larger than a case where the difference is amplified by only the amplification transistor 315.

8. Eighth Embodiment

In the above-described seventh embodiment, the column readout circuit 260 has amplified the difference between the pixel signals of a pair of pixels, but noise is also amplified together with the signals. A solid-state image sensor 200 according to an eighth embodiment is different from that of the seventh embodiment in suppressing the noise by horizontally connecting unit readout circuits 270.

Figure 33:
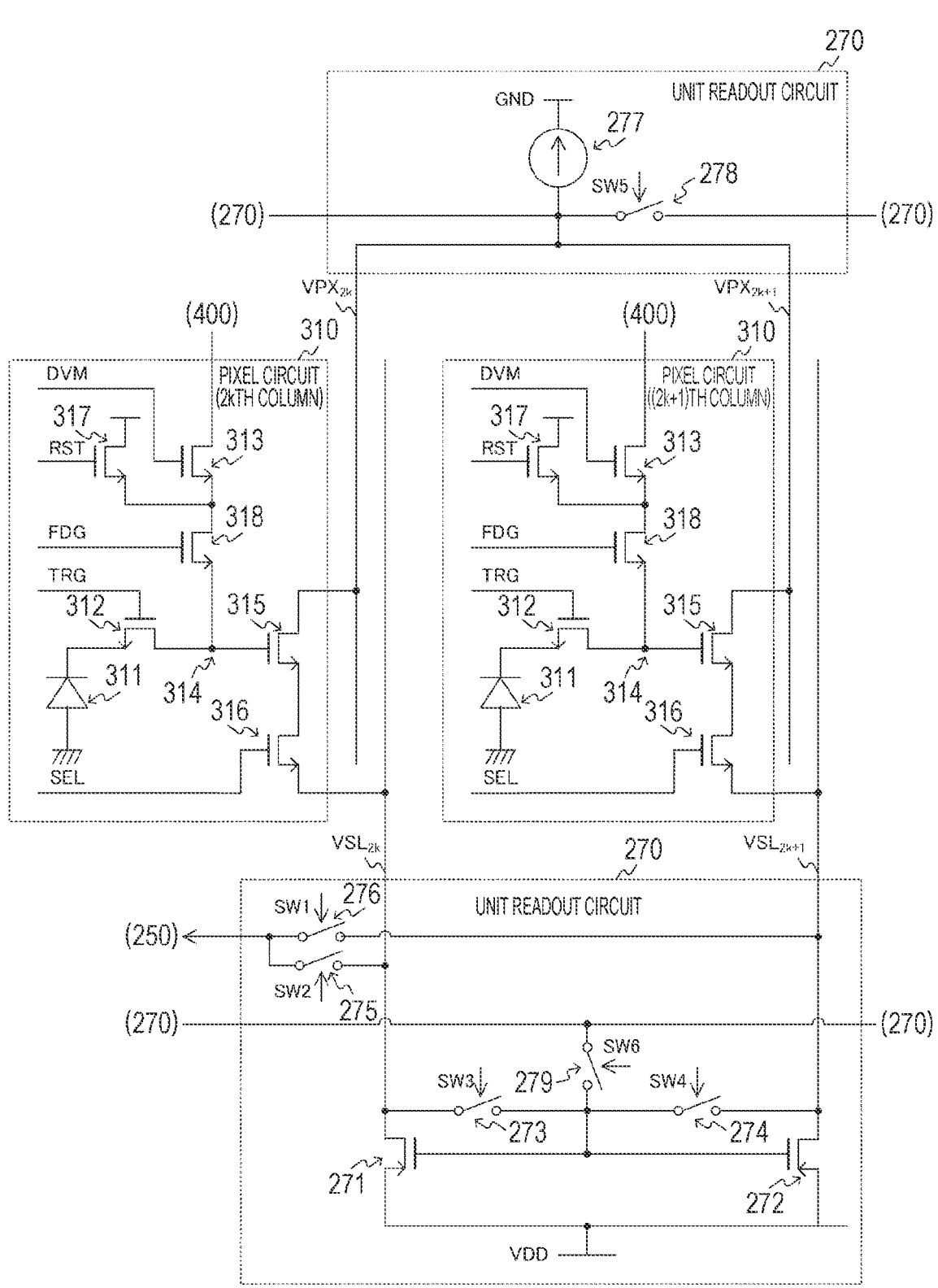
FIG. 33 is a circuit diagram illustrating a configuration example of a unit readout circuit according to an eighth embodiment of the present technology.

FIG. 33 is a circuit diagram illustrating a configuration example of a unit readout circuit 270 according to the eighth embodiment of the present technology. The unit readout circuit 270 of the eighth embodiment is different from that of the seventh embodiment in further including switches 278 and 279.

The switch 279 opens or closes a path between gates of P-type transistors 271 and 272 constituting a current mirror circuit and an adjacent unit readout circuit 270 according to a control signal SW6 from a drive circuit 211. Note that the switch 279 is an example of a first switch described in the claims.

The switch 278 opens or closes a path between a current source 277 and the adjacent unit readout circuit 270 according to a control signal SW5 from the drive circuit 211. Note that the switch 278 is an example of a second switch described in the claims.

The drive circuit 211 sets the switches 278 and 279 to be in a close state in an imaging mode, thereby horizontally connecting a plurality of current sources 277 arrayed in a horizontal direction and a plurality of current mirror circuits. Thereby, the noise generated in nodes can be suppressed according to the number of nodes to be horizontally connected.

As described above, according to the eighth embodiment of the present technology, since the plurality of current sources 277 and the plurality of current mirror circuits are horizontally connected, the noise can be suppressed while amplifying the difference between a pair of pixel signals.

9. Ninth Embodiment

In the above-described first embodiment, the AD converter 251 has been arranged for each column and the AD conversion has been performed in units of rows. However, the time required for the AD conversion becomes longer as the number of rows increases. A solid-state image sensor 200 according to a ninth embodiment is different from that of the first embodiment in arranging an AD converter for each pixel to shorten time required for AD conversion.

Figure 34:
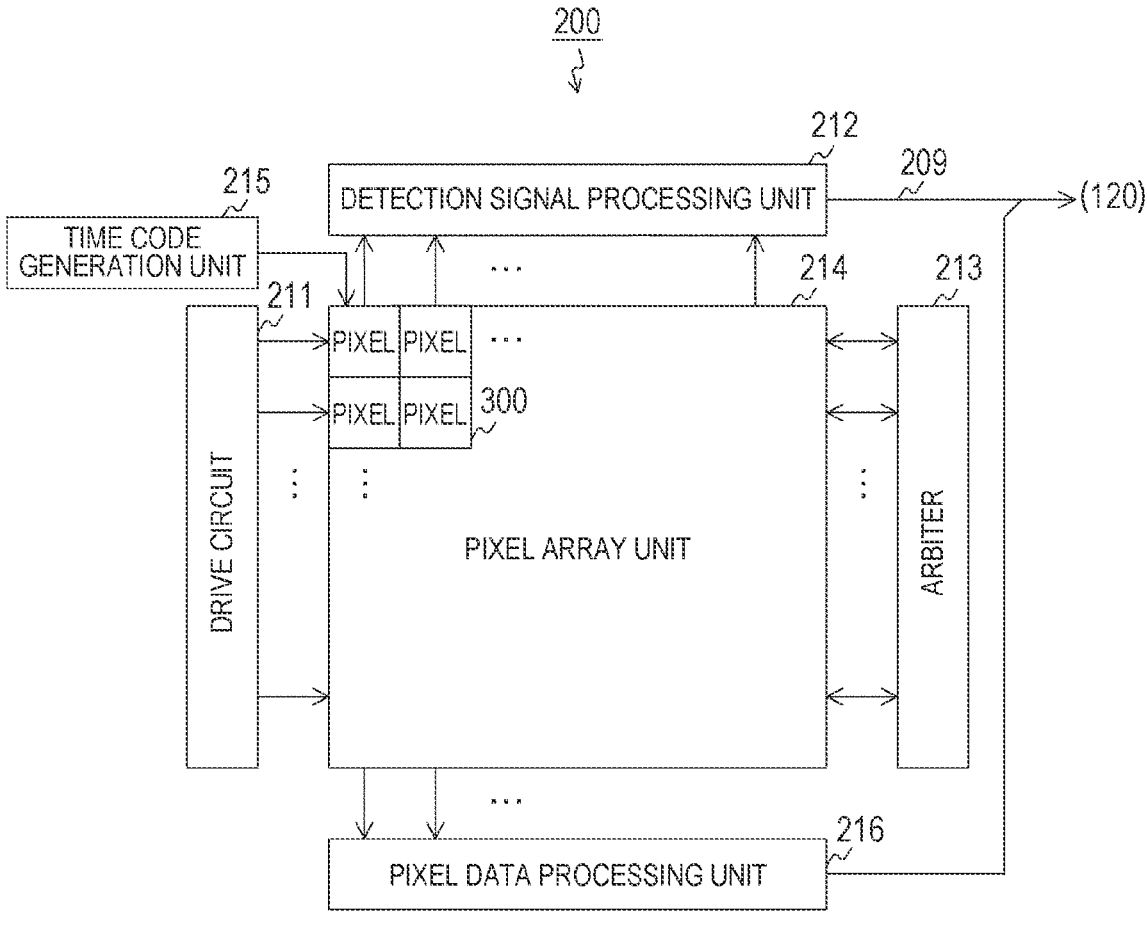
FIG. 34 is a block diagram illustrating a configuration example of a solid-state image sensor according to a ninth embodiment of the present technology.

FIG. 34 is a block diagram illustrating a configuration example of the solid-state image sensor 200 according to the ninth embodiment of the present technology. The solid-state image sensor 200 according to the ninth embodiment is different from that of the first embodiment in further including a time code generation unit 215.

The time code generation unit 215 generates a time code representing time within a period during which a reference signal is converted into a slope shape.

Figure 35:
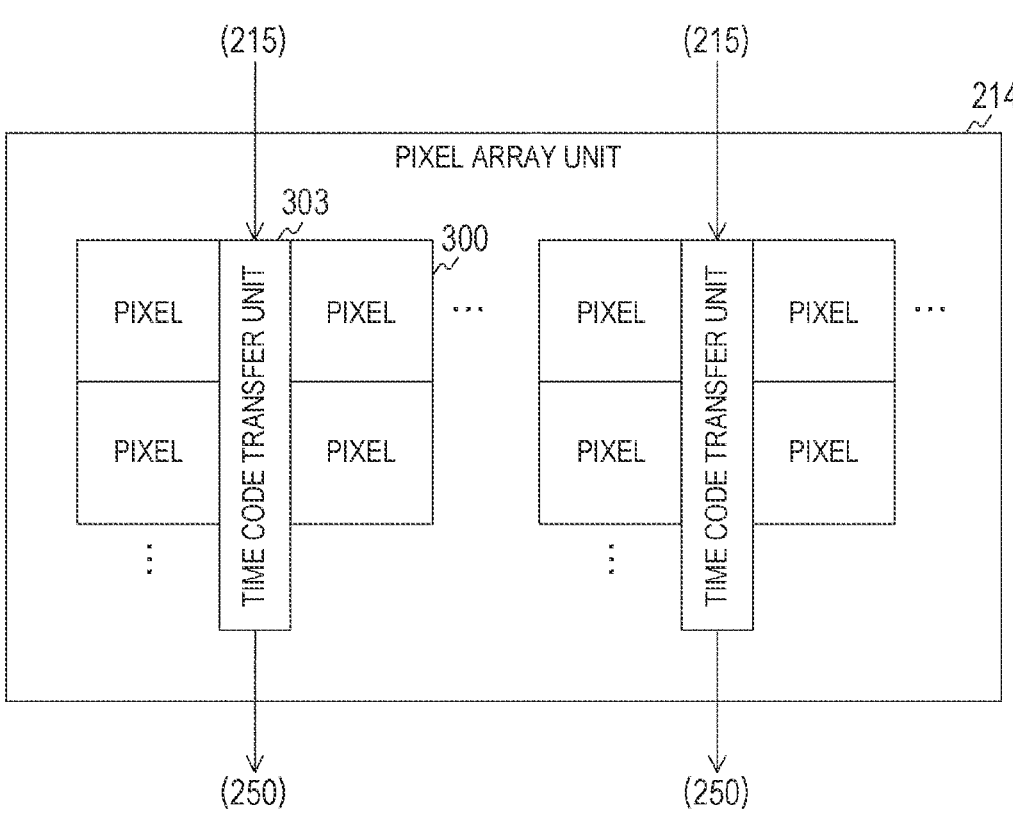
FIG. 35 is a plan view illustrating a configuration example of a pixel array unit according to the ninth embodiment of the present technology.

FIG. 35 is a plan view illustrating a configuration example of a pixel array unit 214 according to the ninth embodiment of the present technology. The pixel array unit 214 of the ninth embodiment further includes a plurality of time code transfer units 303.

The time code transfer unit 303 transfers the time code along a column direction. The time code transfer unit 303 transfers the time code to pixels 300 on both sides. In a case where M (M is an integer) columns are arranged on both sides of the time code transfer unit 303, the time code transfer unit 303 is arranged for each M columns.

The pixel 300 holds the time code at timing when a comparison result between a reference signal and a pixel signal is inverted. Then, the pixel 300 outputs the held time code to the time code transfer unit 303 as a digital signal after AD conversion. The time code transfer unit 303 transfers the digital signal to a column signal processing unit 250.

Furthermore, an AD converter 251 is not arranged in the column signal processing unit 250 of the ninth embodiment, and the column signal processing unit 250 performs CDS processing and the like.

Figure 36:
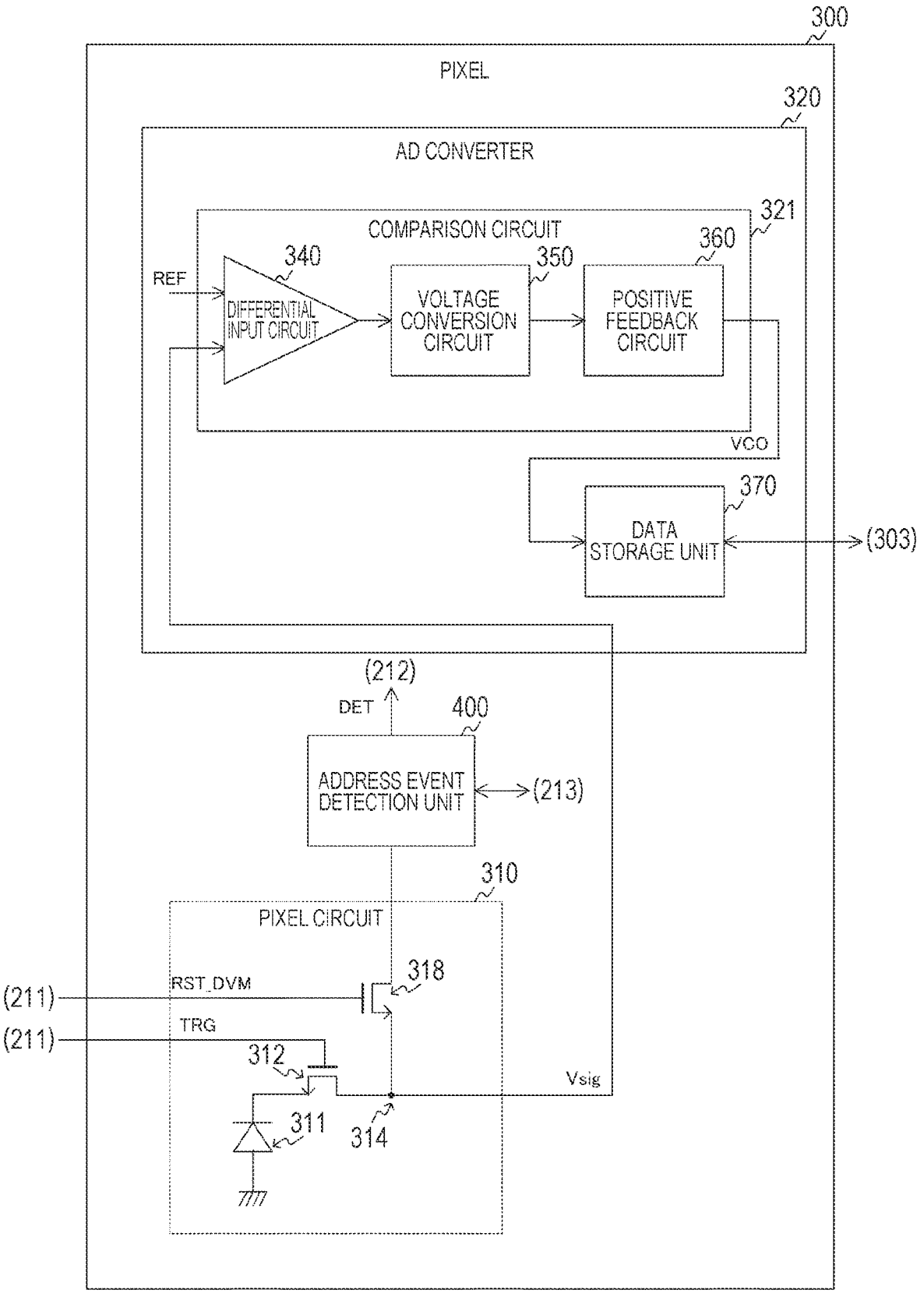
FIG. 36 is a block diagram illustrating a configuration example of a pixel according to the ninth embodiment of the present technology.

FIG. 36 is a block diagram illustrating a configuration example of the pixel 300 according to the ninth embodiment of the present technology. The pixel 300 according to the ninth embodiment is different from that of the first embodiment in further including an AD converter 320.

Furthermore, an amplification transistor 315 and a selection transistor 316 are not arranged in a pixel circuit 310 of the ninth embodiment, and a voltage of a floating diffusion layer 314 is supplied to the AD converter 320 as a pixel signal Vsig.

The AD converter 320 converts the analog pixel signal Vsig from the pixel circuit 310 into a digital signal. The AD converter 320 includes a comparison circuit 321 and a data storage unit 370. The comparison circuit 321 includes a differential input circuit 340, a voltage conversion circuit 350, and a positive feedback circuit 360.

The differential input circuit 340 amplifies a difference between the analog pixel signal Vsig and a predetermined reference signal REF and supplies an amplified signal to the voltage conversion circuit 350. As the reference signal REF, for example, a ramp signal that changes in a slope shape is used.

The voltage conversion circuit 350 converts a voltage of the signal from the differential input circuit 340 and outputs the converted voltage to the positive feedback circuit 360.

The positive feedback circuit 360 adds a part of output to input and outputs the output as an output signal VCO to the data storage unit 370.

The data storage unit 370 holds a time code of when the output signal VCO is inverted. The data storage unit 370 outputs the held time code to the time code transfer unit 303 as a digital signal after AD conversion.

As described above, by arranging the AD converter 320 for each pixel, the solid-state image sensor 200 can simultaneously perform AD conversion for all the pixels. Thereby, the time required for AD conversion can be shortened as compared with the case where AD conversion is performed for each row.

Note that the pixel 300 holds the time code, but the pixel 300 can hold a luminance code indicating a value of the reference signal REF instead of the time code. In this case, a luminance code generation unit and a luminance code transfer unit are arranged in place of the time code generation unit 215 and the time code transfer unit 303.

Furthermore, the second to sixth embodiments can be applied to the solid-state image sensor 200 of the ninth embodiment.

As described above, according to the ninth embodiment of the present technology, since the AD converter 320 is arranged for each pixel, the AD conversion can be performed for all the pixels 300 at the same time. Thereby, the time required for AD conversion can be shortened as compared with the case where AD conversion is performed for each row.

10. Applications to Moving Bodies

The technology according to the present disclosure (present technology) can be applied to various products. For example, the technology according to the present disclosure may be realized as a device mounted on any type of moving bodies including an automobile, an electric automobile, a hybrid electric automobile, a motorcycle, a bicycle, a personal mobility, an airplane, a drone, a ship, a robot, and the like.

Figure 37:
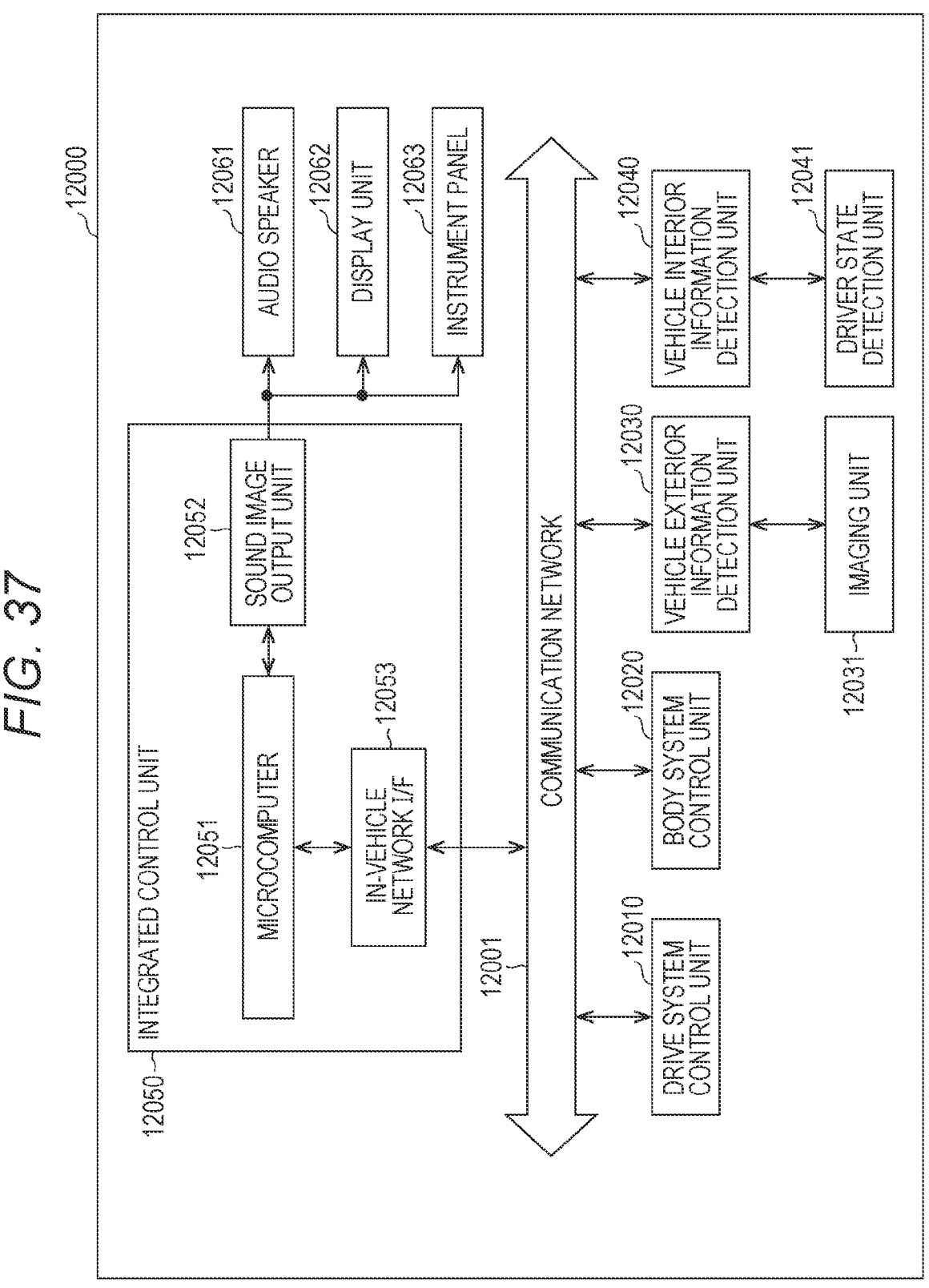
FIG. 37 is a block diagram illustrating a schematic configuration of a vehicle control system.

FIG. 37 is a block diagram illustrating a schematic configuration example of a vehicle control system as an example of a moving body control system to which the technology according to the present disclosure is applicable.

A vehicle control system 12000 includes a plurality of electronic control units connected through a communication network 12001. In the example illustrated in FIG. 37, the vehicle control system 12000 includes a drive system control unit 12010, a body system control unit 12020, a vehicle exterior information detection unit 12030, a vehicle interior information detection unit 12040, and an integrated control unit 12050. Furthermore, as functional configurations of the integrated control unit 12050, a microcomputer 12051, a sound image output unit 12052, and an in-vehicle network interface (I/F) 12053 are illustrated.

The drive system control unit 12010 controls operations of devices regarding a drive system of a vehicle according to various programs. For example, the drive system control unit 12010 functions as a control device of a drive force generation device for generating drive force of a vehicle, such as an internal combustion engine or a drive motor, a drive force transmission mechanism for transmitting drive force to wheels, a steering mechanism that adjusts a steering angle of a vehicle, a braking device that generates braking force of a vehicle, and the like.

The body system control unit 12020 controls operations of various devices equipped in a vehicle body according to various programs. For example, the body system control unit 12020 functions as a control device of a keyless entry system, a smart key system, an automatic window device, and various lamps such as head lamps, back lamps, brake lamps, turn signals, and fog lamps. In this case, radio waves transmitted from a mobile device substituted for a key or signals of various switches can be input to the body system control unit 12020. The body system control unit 12020 receives an input of the radio waves or the signals, and controls a door lock device, the automatic window device, the lamps, and the like of the vehicle.

The vehicle exterior information detection unit 12030 detects information outside the vehicle that mounts the vehicle control system 12000. For example, an imaging unit 12031 is connected to the vehicle exterior information detection unit 12030. The vehicle exterior information detection unit 12030 causes the imaging unit 12031 to capture an image outside the vehicle, and receives the captured image. The vehicle exterior information detection unit 12030 may perform object detection processing or distance detection processing of persons, vehicles, obstacles, signs, letters on a road surface, or the like on the basis of the received image.

The imaging unit 12031 is an optical sensor that receives light and outputs an electrical signal according to a light-receiving amount of the light. The imaging unit 12031 can output the electrical signal as an image and can output the electrical signal as information of distance measurement. Furthermore, the light received by the imaging unit 12031 may be visible light or may be non-visible light such as infrared light.

The vehicle interior information detection unit 12040 detects information inside the vehicle. A driver state detection unit 12041 that detects a state of a driver is connected to the vehicle interior information detection unit 12040, for example. The driver state detection unit 12041 includes a camera that captures the driver, for example, and the vehicle interior information detection unit 12040 may calculate the degree of fatigue or the degree of concentration of the driver, or may determine whether or not the driver falls asleep on the basis of the detection information input from the driver state detection unit 12041.

The microcomputer 12051 calculates a control target value of the drive force generation device, the steering mechanism, or the braking device on the basis of the information outside and inside the vehicle acquired in the vehicle exterior information detection unit 12030 or the vehicle interior information detection unit 12040, and can output a control command to the drive system control unit 12010. For example, the microcomputer 12051 can perform cooperative control for the purpose of realization of an advanced driver assistance system (ADAS) function including collision avoidance or shock mitigation of the vehicle, following travel based on an inter-vehicle distance, vehicle speed maintaining travel, collision warning of the vehicle, lane out warning of the vehicle, and the like.

Furthermore, the microcomputer 12051 controls the drive force generation device, the steering mechanism, the braking device, or the like on the basis of the information of a vicinity of the vehicle acquired in the vehicle exterior information detection unit 12030 or the vehicle interior information detection unit 12040 to perform cooperative control for the purpose of automatic drive of autonomous travel without depending on an operation of the driver or the like.

Furthermore, the microcomputer 12051 can output a control command to the body system control unit 12020 on the basis of the information outside the vehicle acquired in the vehicle exterior information detection unit 12030. For example, the microcomputer 12051 can perform cooperative control for the purpose of achievement of non-glare such as by controlling the head lamps according to the position of a leading vehicle or an oncoming vehicle detected in the vehicle exterior information detection unit 12030, and switching high beam light to low beam light.

The sound image output unit 12052 transmits an output signal of at least one of a sound or an image to an output device that can visually and aurally notify a passenger of the vehicle or an outside of the vehicle of information. In the example in FIG. 37, as the output device, an audio speaker 12061, a display unit 12062, and an instrument panel 12063 are exemplarily illustrated. The display unit 12062 may include, for example, at least one of an on-board display or a head-up display.

Figure 38:
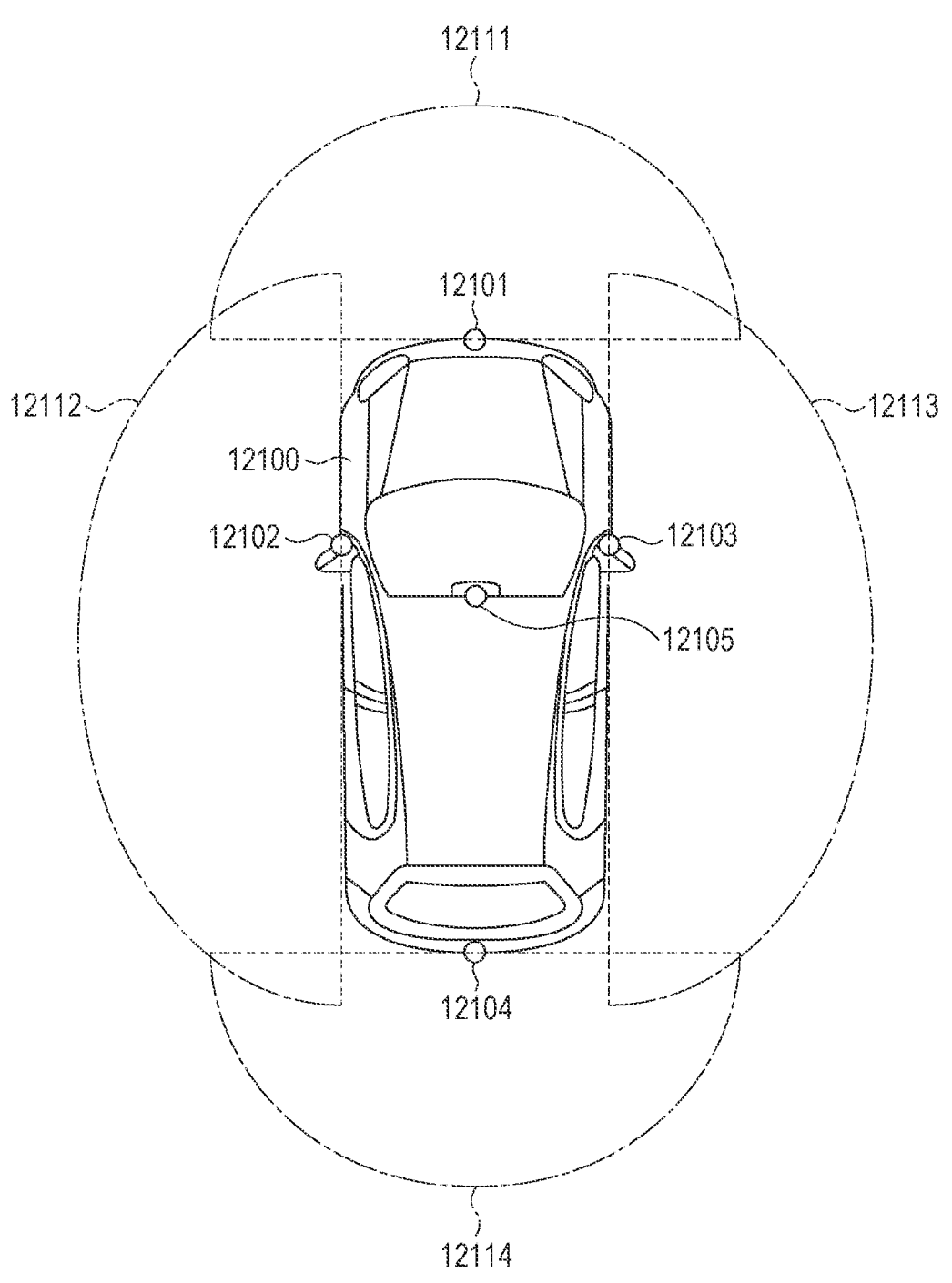
FIG. 38 is an explanatory diagram illustrating an example of installation positions of imaging units.

FIG. 38 is a diagram illustrating an example of an installation position of the imaging unit 12031.

In FIG. 38, imaging units 12101, 12102, 12103, 12104, and 12105 are included as the imaging unit 12031.

The imaging units 12101, 12102, 12103, 12104, and 12105 are provided at positions of a front nose, side mirrors, a rear bumper, a back door, an upper portion of a windshield, and the like in an interior of a vehicle 12100, for example. The imaging unit 12101 provided at the front nose and the imaging unit 12105 provided at an upper portion of the windshield in an interior of the vehicle mainly acquire images in front of the vehicle 12100. The imaging units 12102 and 12103 provided at the side mirrors mainly acquire images on sides of the vehicle 12100. The imaging unit 12104 provided at the rear bumper or the back door mainly acquires images in back of the vehicle 12100. The imaging unit 12105 provided at the upper portion of the windshield in the interior of the vehicle is mainly used for detecting a leading vehicle, a pedestrian, an obstacle, a traffic signal, a traffic sign, a lane, or the like.

Note that FIG. 38 illustrates an example of capture ranges of the imaging units 12101 to 12104. An imaging range 12111 indicates the imaging range of the imaging unit 12101 provided at the front nose, imaging ranges 12112 and 12113 respectively indicate the imaging ranges of the imaging units 12102 and 12103 provided at the side mirrors, and an imaging range 12114 indicates the imaging range of the imaging unit 12104 provided at the rear bumper or the back door. For example, a bird's-eye view image of the vehicle 12100 as viewed from above can be obtained by superimposing image data captured by the imaging units 12101 to 12104.

At least one of the imaging units 12101 to 12104 may have a function to acquire distance information. For example, at least one of the imaging units 12101 to 12104 may be a stereo camera including a plurality of image sensors or may be an image sensor having pixels for phase difference detection.

For example, the microcomputer 12051 obtains distances to three-dimensional objects in the imaging ranges 12111 to 12114 and temporal change of the distances (relative speeds to the vehicle 12100) on the basis of the distance information obtained from the imaging units 12101 to 12104, thereby to extract particularly a three-dimensional object closest to the vehicle 12100 on a traveling road and traveling at a predetermined speed (for example, 0 km/h or more) in substantially the same direction as the vehicle 12100 as a leading vehicle. Moreover, the microcomputer 12051 can set an inter-vehicle distance to be secured from the leading vehicle in advance and perform automatic braking control (including following stop control) and automatic acceleration control (including following start control), and the like. In this way, the cooperative control for the purpose of automatic drive of autonomous travel without depending on an operation of the driver, and the like can be performed.

For example, the microcomputer 12051 classifies three-dimensional object data regarding three-dimensional objects into two-wheeled vehicles, ordinary cars, large vehicles, pedestrians, and other three-dimensional objects such as electric poles to be extracted, on the basis of the distance information obtained from the imaging units 12101 to 12104, and can use the data for automatic avoidance of obstacles. For example, the microcomputer 12051 discriminates obstacles around the vehicle 12100 into obstacles visually recognizable by the driver of the vehicle 12100 and obstacles visually unrecognizable by the driver. The microcomputer 12051 then determines a collision risk indicating a risk of collision with each of the obstacles, and can perform drive assist for collision avoidance by outputting warning to the driver through the audio speaker 12061 or the display unit 12062, and performing forced deceleration or avoidance steering through the drive system control unit 12010, in a case where the collision risk is a set value or more and there is a collision possibility.

At least one of the imaging units 12101 to 12104 may be an infrared camera that detects infrared light. For example, the microcomputer 12051 determines whether or not a pedestrian exists in the captured images of the imaging units 12101 to 12104, thereby to recognize the pedestrian. Such recognition of a pedestrian is performed by a process of extracting characteristic points in the captured images of the imaging units 12101 to 12104, as the infrared camera, for example, and by a process of performing pattern matching processing for the series of characteristic points indicating a contour of an object and determining whether or not the object is a pedestrian. When the microcomputer 12051 determines that a pedestrian exists in the captured images of the imaging units 12101 to 12104 and recognizes the pedestrian, the sound image output unit 12052 causes the display unit 12062 to superimpose and display a square contour line for emphasis on the recognized pedestrian. Furthermore, the sound image output unit 12052 may cause the display unit 12062 to display an icon or the like representing the pedestrian at a desired position.

An example of a vehicle control system to which the technology according to the present disclosure is applicable has been described. The technology according to the present disclosure is applicable to the imaging unit 12031, of the above-described configurations. To be specific, the imaging device 100 in FIG. 1 can be applied to the imaging unit 12031. By applying the technology according to the present disclosure to the imaging unit 12031, high-quality image data can be captured while detecting an address event.

Note that the above-described embodiments describe an example for embodying the present technology, and the matters in the embodiments and the matters used to specify the invention in the claims have corresponding relationships with each other. Similarly, the matters used to specify the invention in the claims and the matters in the embodiment of the present technology given the same names have corresponding relationships with each other. However, the present technology is not limited to the embodiments, and can be embodied by application of various modifications to the embodiments without departing from the gist of the present technology.

Furthermore, the processing procedures described in the above embodiments may be regarded as a method having these series of procedures, and also regarded as a program for causing a computer to execute these series of procedures and as a recording medium for storing the program. As this recording medium, for example, a compact disc (CD), a MiniDisc (MD), a digital versatile disc (DVD), a memory card, a Blu-ray (registered trademark) disc, or the like can be used.

Note that the effects described in the present specification are merely examples and are not limited, and other effects may be exhibited.

Note that the present technology can also have the following configurations.

(1) A solid-state image sensor including:

a photoelectric conversion element configured to generate a charge by photoelectric conversion;

a charge accumulation unit configured to accumulate the charge and generate a voltage according to an amount of the charge;

a transfer transistor configured to transfer the charge from the photoelectric conversion element to the charge accumulation unit;

a detection unit configured to detect whether or not a change amount of a photocurrent according to the amount of the charge exceeds a predetermined threshold; and a connection transistor configured to connect the charge accumulation unit and the detection unit and allow the photocurrent to flow.

(2) The solid-state image sensor according to (1), in which the photoelectric conversion element, the charge accumulation unit, and the connection transistor are arranged in each of a predetermined number of pixels, and the predetermined number of pixels shares the detection unit.

(3) The solid-state image sensor according to (1) or (2), in which the photoelectric conversion element and the transfer transistor are arranged in each of a predetermined number of pixels, and the predetermined number of pixels shares the charge accumulation unit.

(4) The solid-state image sensor according to any one of (1) to (3), in which the connection transistor transitions to a close state to connect the charge accumulation unit and the detection unit in a case where a predetermined detection mode for detecting whether or not the change amount exceeds the threshold is set, and connects the charge accumulation unit and the detection unit for a first pulse period before the charge is transferred in a case where a predetermined imaging mode for capturing image data is set.

(5) The solid-state image sensor according to any one of (1) to (4), further including:

a reset transistor configured to initialize the charge accumulation unit.

(6) The solid-state image sensor according to (5), in which the connection transistor transitions to a close state to connect the charge accumulation unit and the detection unit in a case where a predetermined detection mode for detecting whether or not the change amount exceeds the threshold is set, and transitions to an open state in a case where a predetermined imaging mode for capturing image data is set, and the reset transistor initializes the charge accumulation unit over a predetermined reset period in the case where the imaging mode is set.

(7) The solid-state image sensor according to (1), further including:

a conversion efficiency control transistor configured to control conversion efficiency for converting the charge into the voltage.

(8) The solid-state image sensor according to (7), in which the connection transistor transitions to a close state to connect the charge accumulation unit and the detection unit in a case where a predetermined detection mode for detecting whether or not the change amount exceeds the threshold is set, and connects the charge accumulation unit and the detection unit over a predetermined reset period in a case where a predetermined imaging mode for capturing image data is set, and the conversion efficiency control transistor controls the conversion efficiency within a transfer period in which the charge is transferred in the case where the imaging mode is set.

(9) The solid-state image sensor according to (1), further including:

a reset transistor configured to initialize the charge accumulation unit; and a conversion efficiency control transistor configured to control conversion efficiency for converting the charge into the voltage.

(10) The solid-state image sensor according to (9), in which the connection transistor transitions to a close state to connect the charge accumulation unit and the detection unit in a case where a predetermined detection mode for detecting whether or not the change amount exceeds the threshold is set, and transitions to an open state in a case where a predetermined imaging mode for capturing image data is set, the reset transistor initializes the charge accumulation unit within a predetermined reset period in the case where the imaging mode is set, and the conversion efficiency control transistor controls the conversion efficiency within a transfer period in which the charge is transferred in the case where the imaging mode is set.

(11) The solid-state image sensor according to any one of (1) to (10), further including:

a readout circuit configured to amplify and output a difference between signals according to the voltages of a pair of pixels, in which the photoelectric conversion element, the charge accumulation unit, and the connection transistor are arranged in each of the pair of pixels.

(12) The solid-state image sensor according to (11), in which the transfer transistor includes first and second transfer transistors, the first transfer transistor is arranged in one of the pair of pixels and the second transfer transistor is arranged in the other of the pair of pixels, and one of the first and second transfer transistors transfers the charge and the other transfer transistor is in an off state during transfer by the one transfer transistor.

(13) The solid-state image sensor according to (11) or (12), in which the readout circuit includes a predetermined number of unit readout circuits, and each of the unit readout circuits includes a current source, a current mirror circuit, a first switch that connects the current sources of the predetermined number of unit readout circuits, and a second switch that connects the current mirror circuits of the predetermined number of unit readout circuits.

(14) The solid-state image sensor according to (1), further including:

an analog-digital converter configured to convert an analog signal according to the voltage into a digital signal, in which the photoelectric conversion element, the charge accumulation unit, the transfer transistor, the detection unit, the connection transistor, and the analog-digital converter are arranged in each of a plurality of pixels.

(15) An imaging device including:

a photoelectric conversion element configured to generate a charge by photoelectric conversion;

a charge accumulation unit configured to accumulate the charge and generate a voltage according to an amount of the charge;

a transfer transistor configured to transfer the charge from the photoelectric conversion element to the charge accumulation unit;

a detection unit configured to detect whether or not a change amount of a photocurrent according to the amount of the charge exceeds a predetermined threshold;

a connection transistor configured to connect the charge accumulation unit and the detection unit and allow the photocurrent to flow; and a digital signal processing unit configured to process a digital signal obtained by performing analog-digital conversion for an analog signal according to the voltage.

(16) A method of controlling a solid-state image sensor, the method including:

a transfer procedure of transferring, from a photoelectric conversion element that generates a charge by photoelectric conversion, the charge to a charge accumulation unit that accumulates the charge and generates a voltage according to an amount of the charge;

a detection procedure of detecting whether or not a change amount of a photocurrent according to the amount of the charge exceeds a predetermined threshold; and a connection procedure of connecting the charge accumulation unit and the detection unit and allowing the photocurrent to flow.

REFERENCE SIGNS LIST

100 Imaging device
110 Imaging lens
120 Recording unit
130 Control unit
200 Solid-state image sensor
201 Light-receiving chip
202 Circuit chip
211 Drive circuit
212 Detection signal processing unit
213 Arbiter
214 Pixel array unit
215 Time code generation unit
250 Column signal processing unit
251, 320AD converter
252 Memory
253 Output unit
254 Digital calculation unit
255 Interface unit
260 Column readout circuit
270 Unit readout circuit
271, 272, 414, 421, 422, 432, 433, 441, 443P-type transistor
273 to 276, 278, 279 Switch
277 Current source
300 Pixel
301 Detection circuit shared block 302 FD shared block
303 Time code transfer unit
310 Pixel circuit
311 Photoelectric conversion element
312 Transfer transistor
313 Connection transistor
314 Floating diffusion layer
315 Amplification transistor
316 Selection transistor
317 Reset transistor
318 Conversion efficiency control transistor
321 Comparison circuit
340 Differential input circuit
350 Voltage conversion circuit
360 Positive feedback circuit
370 Data storage unit
400 Address event detection unit
410 Current-voltage conversion unit
412, 415, 435, 442, 444N-type transistor
413, 431, 434 Capacitance
420 Buffer
430 Differentiator circuit
440 Comparator
450 Transfer unit
12031 Imaging unit

The invention claimed is:

1. A solid-state image sensor, comprising:

a photoelectric conversion element configured to generate a charge based on photoelectric conversion;

a charge accumulation unit configured to:

accumulate the charge; and generate a voltage based on an amount of the charge;

a detection unit configured to detect whether a change amount of a photocurrent based on the amount of the charge exceeds a threshold; and a connection transistor configured to:

connect the charge accumulation unit and the detection unit; and allow the photocurrent to flow.

2. The solid-state image sensor according to claim 1, further comprising a transfer transistor configured to transfer the charge from the photoelectric conversion element to the charge accumulation unit.

3. The solid-state image sensor according to claim 1, wherein the photoelectric conversion element, the charge accumulation unit, and the connection transistor are arranged in each pixel of a specific number of pixels, and the specific number of pixels shares the detection unit.

4. The solid-state image sensor according to claim 2, wherein the photoelectric conversion element and the transfer transistor are arranged in each of a specific number of pixels, and the specific number of pixels shares the charge accumulation unit.

5. The solid-state image sensor according to claim 1, wherein the connection transistor is further configured to:

transition to a close state;

connect the charge accumulation unit and the detection unit based on the close state, wherein the charge accumulation unit and the detection unit are connected in a case where a specific detection mode is set, wherein the specific detection mode is to detect whether the change amount exceeds the threshold; and connect the charge accumulation unit and the detection unit for a first pulse period before the charge is transferred in a case where a specific imaging mode is set, wherein the specific imaging mode is to capture image data.

6. The solid-state image sensor according to claim 1, further comprising a reset transistor configured to initialize the charge accumulation unit.

7. The solid-state image sensor according to claim 6, wherein the connection transistor is further configured to:

transition to a close state;

connect the charge accumulation unit and the detection unit based on the close state, wherein the charge accumulation unit and the detection unit are connected in a case where a specific detection mode is set, and the specific detection mode is to detect whether the change amount exceeds the threshold; and transition to an open state in a case where a specific imaging mode is set, wherein the specific imaging mode is to capture image data, and the reset transistor is further configured to initialize the charge accumulation unit over a specific reset period in the case where the specific imaging mode is set.

8. The solid-state image sensor according to claim 1, further comprising a conversion efficiency control transistor configured to control a conversion efficiency to convert the charge into the voltage.

9. The solid-state image sensor according to claim 8, wherein the connection transistor is further configured to:

transition to a close state;

connect the charge accumulation unit and the detection unit based on the close state, wherein the charge accumulation unit and the detection unit are connected in a case where a specific detection mode is set, wherein the specific detection mode is to detect whether the change amount exceeds the threshold; and connect the charge accumulation unit and the detection unit over a specific reset period in a case where a specific imaging mode is set, wherein the specific imaging mode is to capture image data, and the conversion efficiency control transistor is further configured to control the conversion efficiency within a transfer period in which the charge is transferred in the case where the specific imaging mode is set.

10. The solid-state image sensor according to claim 1, further comprising:

a reset transistor configured to initialize the charge accumulation unit; and a conversion efficiency control transistor configured to control conversion efficiency to convert the charge into the voltage.

11. The solid-state image sensor according to claim 10, wherein the connection transistor is further configured to:

transition to a close state;

connect the charge accumulation unit and the detection unit based on the close state, wherein the charge accumulation unit and the detection unit are connected in a case where a specific detection mode is set, and the specific detection mode is to detect whether the change amount exceeds the threshold; and transition to an open state in a case where a specific imaging mode is set, wherein the specific imaging mode is to capture image data, the reset transistor is further configured to initialize the charge accumulation unit within a specific reset period in the case where the specific imaging mode is set, and the conversion efficiency control transistor is further configured to control the conversion efficiency within a transfer period in which the charge is transferred in the case where the specific imaging mode is set.

12. The solid-state image sensor according to claim 2, further comprising a readout circuit configured to:

amplify a difference between signals based on voltages of a pair of pixels; and output the amplified difference between the signals, wherein the photoelectric conversion element, the charge accumulation unit, and the connection transistor are arranged in each of the pair of pixels.

13. The solid-state image sensor according to claim 12, wherein the transfer transistor includes:

a first transfer transistor; and a second transfer transistor, wherein the first transfer transistor is in a first pixel of the pair of pixels, the second transfer transistor is in a second pixel of the pair of pixels, and one transfer transistor of the first transfer transistor and the second transfer transistor is configured to transfer the charge and another transfer transistor of the first transfer transistor and second transfer transistor is in an off state at a time of the transfer by the one transfer transistor.

14. The solid-state image sensor according to claim 12, wherein the readout circuit includes a number of unit readout circuits, and each unit readout circuit of the unit readout circuits includes:

a current source;

a current mirror circuit;

a first switch configured to connect the current source of the each unit readout circuit of the number of unit readout circuits; and a second switch configured to connect the current mirror circuit of the each unit readout circuit of the number of unit readout circuits.

15. The solid-state image sensor according to claim 2, further comprising an analog-digital converter configured to convert an analog signal based on the voltage into a digital signal, wherein the photoelectric conversion element, the charge accumulation unit, the transfer transistor, the detection unit, the connection transistor, and the analog-digital converter are in each pixel of a plurality of pixels.

16. The solid-state image sensor according to claim 2, further comprising:

an amplification transistor coupled to the charge accumulation unit, wherein the amplification transistor is configured to:

amplify the voltage generated in the charge accumulation unit; and output an analog pixel signal;

a selection transistor coupled to the amplification transistor, wherein the selection transistor is configured to supply the analog pixel signal selectively to a vertical signal line; and an analog-digital converter configured to convert the analog pixel signal into a digital pixel signal.

17. An imaging device, comprising:

a photoelectric conversion element configured to generate a charge based on photoelectric conversion;

a charge accumulation unit configured to:
   accumulate the charge; and
   generate a voltage based on an amount of the charge;

a detection unit configured to detect whether a change amount of a photocurrent based on the amount of the charge exceeds a threshold;

a connection transistor configured to:
   connect the charge accumulation unit and the detection unit; and
   allow the photocurrent to flow; and

34 a digital signal processing unit configured to:
   obtain a digital signal based on an analog-digital conversion for an analog signal, wherein the analog-digital conversion is based on the voltage; and
   process the digital signal.

18. A method of controlling a solid-state image sensor, the method comprising:

generating, by a photoelectric conversion element, a charge based on photoelectric conversion;

accumulating, by a charge accumulation unit, the charge;

generating, by the charge accumulation unit, a voltage based on an amount of the charge;

detecting, by a detection unit, whether a change amount of a photocurrent based on the amount of the charge exceeds a threshold;

connecting, by a connection transistor, the charge accumulation unit and the detection unit; and allowing, by the connection transistor, the photocurrent to flow.

* * * * *